(12) United States Patent
Yanase et al.

(10) Patent No.: US 9,338,120 B2
(45) Date of Patent: May 10, 2016

(54) E-MAIL SYSTEM, CONTROL METHOD FOR E-MAIL SYSTEM, RELAY DEVICE, PROGRAM, AND INFORMATION STORAGE MEDIUM

(75) Inventors: Naohiro Yanase, Tokyo (JP); Hidetaka Sugawara, Tokyo (JP); Akihiro Kato, Tokyo (JP); Ryohei Shimada, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/113,970

(22) PCT Filed: Feb. 3, 2012

(86) PCT No.: PCT/JP2012/052531
§ 371 (c)(1),
(2), (4) Date: Oct. 25, 2013

(87) PCT Pub. No.: WO2012/147384
PCT Pub. Date: Nov. 1, 2012

(65) Prior Publication Data
US 2014/0052805 A1 Feb. 20, 2014

(30) Foreign Application Priority Data
Apr. 28, 2011 (JP) .................................. 2011-102479

(51) Int. Cl.
*H04L 12/58* (2006.01)

(52) U.S. Cl.
CPC ................ *H04L 51/30* (2013.01); *H04L 51/28* (2013.01)

(58) Field of Classification Search
None
See application file for complete search history.

(56) References Cited

U.S. PATENT DOCUMENTS

| | | | |
|---|---|---|---|
| 6,654,779 B1 | 11/2003 | Tsuei | |
| 6,854,007 B1* | 2/2005 | Hammond | 709/206 |
| 6,865,594 B1* | 3/2005 | Belissent | H04L 29/12066 709/206 |
| 7,054,907 B1* | 5/2006 | Sherwood | G06Q 10/107 709/206 |
| 7,093,025 B1* | 8/2006 | Gupta | H04L 51/14 709/204 |
| 7,191,187 B2* | 3/2007 | Takeshita | G06F 17/3089 |

(Continued)

FOREIGN PATENT DOCUMENTS

| | | |
|---|---|---|
| JP | 2001-237873 A | 8/2001 |
| JP | 2002-215536 A | 8/2002 |

(Continued)

OTHER PUBLICATIONS

Korean Office Action dated Mar. 7, 2014 issued in Korean Patent Application No. 10-2013-7031151.

(Continued)

*Primary Examiner* — Ninos Donabed
(74) *Attorney, Agent, or Firm* — Sughrue Mion, PLLC

(57) ABSTRACT

To provide an e-mail system for ensuring that a user is able to know content of an e-mail sent addressed to the user even when the e-mail is not delivered to the user. An e-mail sending unit (220) sends an e-mail sent addressed to the alternative mail address of the user to the actual mail address of the user, after setting a predetermined destination as a destination of a notice of failed delivery, if caused, of the e-mail. In a case where the notice of failed delivery of the e-mail sent addressed to the actual mail address of the user is received by the predetermined destination, an undelivered mail data saving unit (230) saves undelivered mail data indicating the undelivered e-mail in an undelivered mail data storage unit (410). An undelivered mail data sending unit (110) sends undelivered mail data indicating an e-mail sent addressed to the actual mail address of the user and failed to be delivered to a terminal device used by the user.

15 Claims, 14 Drawing Sheets

(56) References Cited

U.S. PATENT DOCUMENTS

| | | | |
|---|---|---|---|
| 7,240,199 B2* | 7/2007 | Tomkow | H04L 12/5875 380/285 |
| 7,254,606 B2* | 8/2007 | Hamada | 709/203 |
| 7,436,947 B2* | 10/2008 | Ordille | G06F 17/30864 370/465 |
| 7,660,858 B2* | 2/2010 | Tsutsui | 709/206 |
| 8,458,261 B1* | 6/2013 | Liao et al. | 709/206 |
| 8,463,862 B2* | 6/2013 | Horstmann et al. | 709/206 |
| 2002/0023138 A1* | 2/2002 | Quine et al. | 709/206 |
| 2002/0042815 A1* | 4/2002 | Salzfass et al. | 709/206 |
| 2003/0018722 A1 | 1/2003 | Almeda et al. | |
| 2004/0193690 A1* | 9/2004 | Nagai | 709/206 |
| 2004/0205026 A1* | 10/2004 | Shah et al. | 705/50 |
| 2005/0108435 A1* | 5/2005 | Nowacki | H04L 51/066 709/246 |
| 2006/0173824 A1* | 8/2006 | Bensky et al. | 707/3 |
| 2006/0209342 A1* | 9/2006 | Ferlitsch et al. | 358/1.15 |
| 2006/0212522 A1* | 9/2006 | Walter | H04L 51/30 709/206 |
| 2006/0288297 A1* | 12/2006 | Haitani et al. | 715/739 |
| 2007/0005970 A1* | 1/2007 | Trupp | H04L 12/585 713/170 |
| 2007/0073819 A1* | 3/2007 | Gardner | G06Q 10/107 709/206 |
| 2007/0179799 A1* | 8/2007 | Laghrari | 705/1 |
| 2007/0233789 A1* | 10/2007 | Agarwal | G06Q 10/107 709/206 |
| 2007/0233790 A1* | 10/2007 | Agarwal | G06Q 10/107 709/206 |
| 2007/0244974 A1* | 10/2007 | Chasin | G06Q 10/107 709/206 |
| 2007/0271517 A1* | 11/2007 | Finkelman | G06Q 50/18 715/742 |
| 2008/0027605 A1* | 1/2008 | Oesterling | G06Q 10/00 701/31.4 |
| 2008/0040432 A1* | 2/2008 | Murphy | G06Q 10/107 709/206 |
| 2008/0109520 A1* | 5/2008 | Tomita | 709/206 |
| 2008/0189248 A1* | 8/2008 | Chung | 707/3 |
| 2008/0207181 A1* | 8/2008 | Jiang | H04W 4/14 455/414.1 |
| 2008/0256355 A1* | 10/2008 | Takemoto | 713/153 |
| 2008/0306831 A1* | 12/2008 | Abraham | 705/26 |
| 2009/0228360 A1* | 9/2009 | Mancarella et al. | 705/14 |
| 2009/0307271 A1* | 12/2009 | Essenmacher | G06Q 10/107 |
| 2009/0307315 A1* | 12/2009 | Murphy, Jr. | G06Q 10/107 709/206 |
| 2009/0307323 A1* | 12/2009 | Kato et al. | 709/206 |
| 2009/0327407 A1* | 12/2009 | Gropper | G06Q 30/02 709/206 |
| 2011/0153365 A1* | 6/2011 | Meier et al. | 705/3 |
| 2014/0289345 A1* | 9/2014 | Katz et al. | 709/206 |

FOREIGN PATENT DOCUMENTS

| | | |
|---|---|---|
| JP | 2007-233711 A | 9/2007 |
| KR | 20020030704 A | 4/2002 |
| KR | 20030010413 A | 2/2003 |
| KR | 20050071449 A | 7/2005 |
| WO | 0184812 A2 | 11/2001 |

* cited by examiner

FIG.3

| PURCHASE HISTORY LIST | | | | |
|---|---|---|---|---|
| UNDELIVERED MAIL LIST ~63 | | | 61 | |
| DATE OF USE | SHOP USED | PRODUCT NAME | NUMBER OF ITEMS | |
| 2011/4/20 | SHOP A | BOOTS A | 1 | SEE DETAILS |
| --- | --- | --- | --- | SEE DETAILS |
| --- | --- | --- | --- | SEE DETAILS |
| --- | --- | --- | --- | SEE DETAILS |
| --- | --- | --- | --- | SEE DETAILS |
| --- | --- | --- | --- | SEE DETAILS |
| --- | --- | --- | --- | SEE DETAILS |
| --- | --- | --- | --- | SEE DETAILS |

FIG.4

| UNDELIVERED MAIL LIST | | | | 73 |
| --- | --- | --- | --- | --- |
| | | 71 | | PURCHASE HISTORY LIST |
| TITLE | SHOP ADDRESS | CUSTOMER ADDRESS | SENDING DATE | |
| — — — | shop_a@bbb.jp | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |
| — — — | — — — | taro@aaa.jp | — — — | SEE DETAILS |

| UNDELIVERED MAIL DETAILS | | | |
|---|---|---|---|
| | | | UNDELIVERED MAIL LIST |
| TITLE | SHOP ADDRESS | CUSTOMER ADDRESS | SENDING DATE |
| --- | shop_a@bbb.jp | taro@aaa.jp | --- |

FIG.6

| USER ID | NAME | ADDRESS | ACTUAL MAIL ADDRESS | ALTERNATIVE MAIL ADDRESS | ... |
|---|---|---|---|---|---|
| U0001 | TARO YAMADA | --- | taro@aaa.jp | xxx@ccc.jp | ... |
| U0002 | HANAKO TANAKA | --- | hanako@eee.jp | yyy@ccc.jp | ... |
| ... | ... | ... | ... | ... | ... |

FIG.7

| SHOP ID | SHOP NAME | MAIL ADDRESS | ... |
|---|---|---|---|
| S0001 | SHOP A | shop_a@bbb.jp | ... |
| ... | ... | ... | ... |

FIG.8

| ORDER NUMBER | USER ID | USER MAIL ADDRESS | SHOP ID | SHOP MAIL ADDRESS | DATE | PRODUCT ID | NUMBER OF ITEMS | PRICE |
|---|---|---|---|---|---|---|---|---|
| 0000001 | U0001 | taro@aaa.jp | S0001 | shop_a@bbb.jp | --- | G0001 | 1 | 5000 |
| ... | ... | ... | ... | ... | ... | ... | ... | ... |

| Envelop From | shop_a@bbb.jp |
|---|---|
| Envelop To | xxx@ccc.jp |
| From | shop_a@bbb.jp |
| To | xxx@ccc.jp |

| Envelop From | err@ccc.jp |
|---|---|
| Envelop To | taro@aaa.jp |
| From | shop_a@bbb.jp |
| To | taro@aaa.jp |

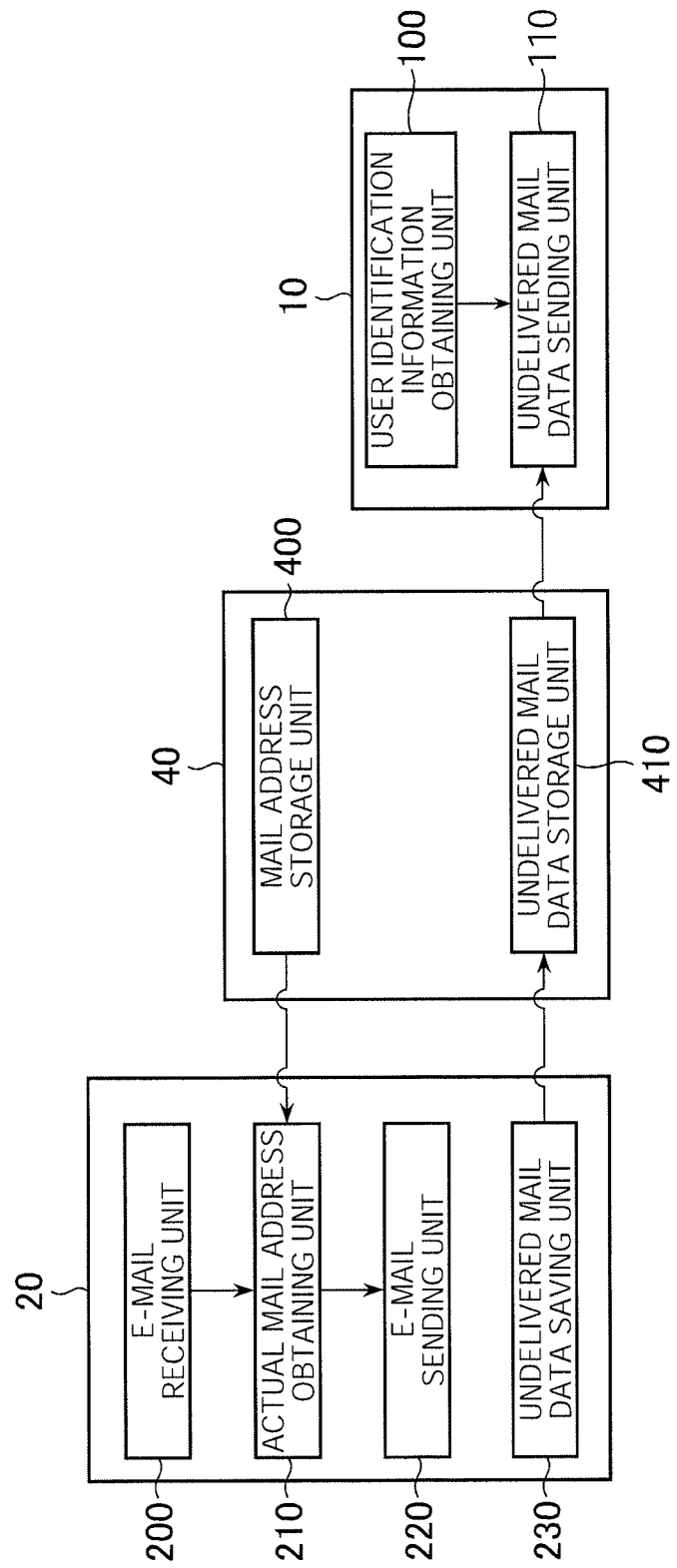

| ACTUAL MAIL ADDRESS | ALTERNATIVE MAIL ADDRESS |
|---|---|
| taro@aaa.jp | xxx@ccc.jp |
| hanako@eee.jp | yyy@ccc.jp |
| ... | ... |

| MAIL ID | TITLE | SOURCE | DESTINATION | SENDING DATE | MAIL BODY |
|---|---|---|---|---|---|
| M0001 | --- | shop_a@bbb.jp | taro@aaa.jp | --- | --- |
| ... | ... | ... | ... | ... | ... |

FIG.17

| MAIL ID | USER ID | TITLE | SOURCE | DESTINATION | SENDING DATE | MAIL BODY |
|---|---|---|---|---|---|---|
| M0001 | U0001 | --- | shop_a@bbb.jp | taro@aaa.jp | --- | --- |
| ... | ... | ... | ... | ... | ... | ... |

FIG.18

| MAIL ID | TITLE | SOURCE | DESTINATION | SENDING DATE | MAIL BODY | UNDELIVERED FLAG |
|---|---|---|---|---|---|---|
| M0001 | --- | shop_a@bbb.jp | taro@aaa.jp | --- | --- | 1 |
| M0002 | --- | shop_a@bbb.jp | hanako@eee.jp | --- | --- | 0 |
| ... | ... | ... | ... | ... | ... | ... |

FIG.19

| SHOP ID | SHOP NAME | ACTUAL MAIL ADDRESS | ALTERNATIVE MAIL ADDRESS | ... |
|---|---|---|---|---|
| S0001 | SHOP A | shop_a@bbb.jp | zzz@ccc.jp | ... |
| ... | ... | ... | ... | ... |

FIG.20

| Envelop From | err@ccc.jp |
|---|---|
| Envelop To | taro@aaa.jp |
| From | zzz@ccc.jp |
| To | taro@aaa.jp |

| Envelop From | taro@aaa.jp |
| --- | --- |
| Envelop To | zzz@ccc.jp |
| From | taro@aaa.jp |
| To | zzz@ccc.jp |

| Envelop From | err@ccc.jp |
| --- | --- |
| Envelop To | shop_a@bbb.jp |
| From | xxx@ccc.jp |
| To | shop_a@bbb.jp |

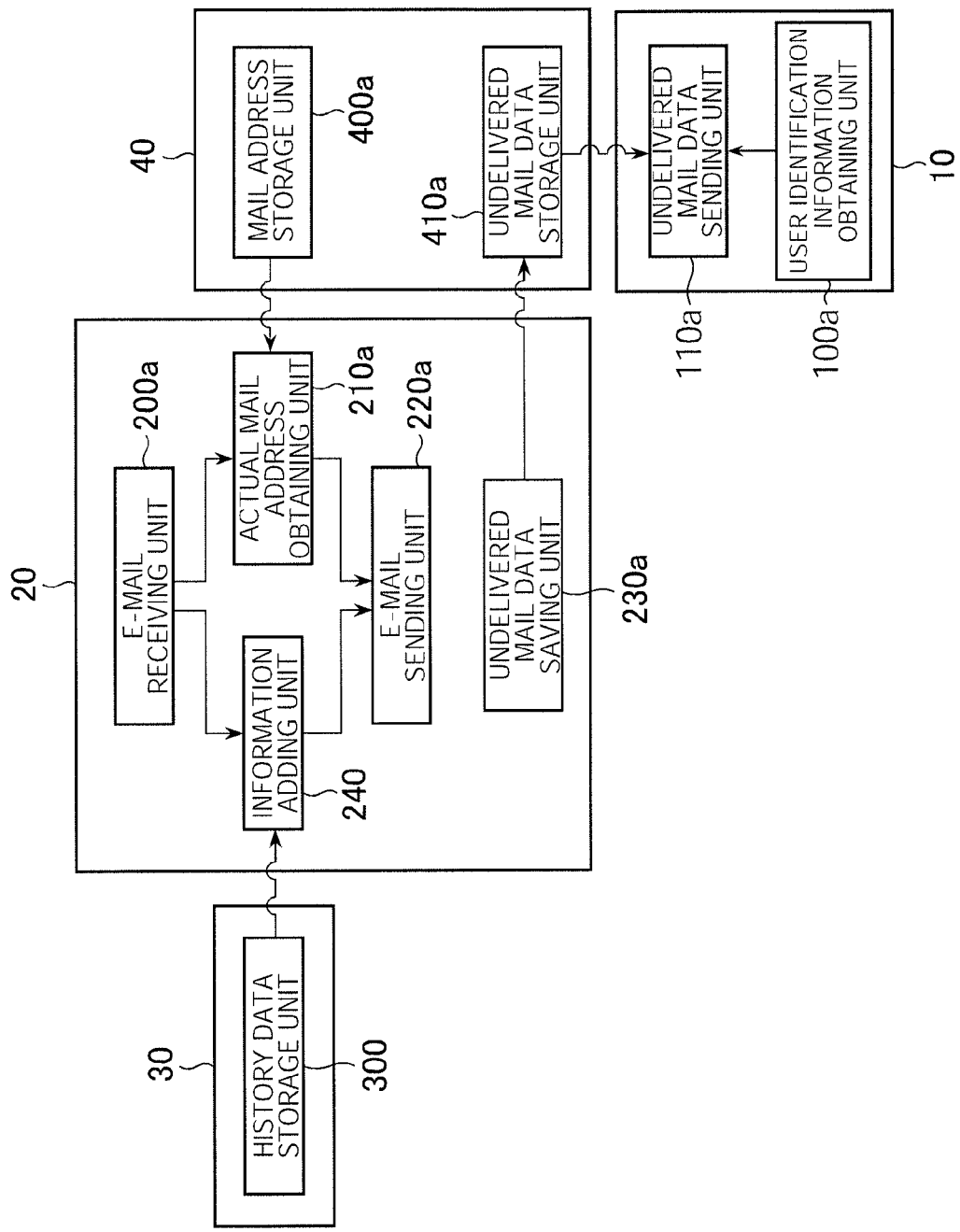

E-MAIL SYSTEM, CONTROL METHOD FOR E-MAIL SYSTEM, RELAY DEVICE, PROGRAM, AND INFORMATION STORAGE MEDIUM

CROSS REFERENCE TO RELATED APPLICATIONS

This application is a National Stage of International Application No. PCT/JP2012/052531, filed on Feb. 3, 2012, which claims priority from Japanese Patent Application No. 2011-102479, filed on Apr. 28, 2011, the contents of all of which are incorporated herein by reference in their entirety.

TECHNICAL FIELD

The present invention relates to an e-mail (electronic mail) system, a control method for an e-mail system, a relay device, a program, and an information storage medium.

BACKGROUND ART

Transaction with others by sending and receiving an e-mail is generally performed. For example, according to an e-commerce (electronic commerce) system, transaction between a product seller or a service provider and a user is performed using an e-mail.

There maybe a case in which an e-mail is failed to be delivered to the addressee for a variety of reasons. For example, in cases where a user has set mail rejection, where a user has changed his/her mail address, and so forth, an e-mail from a product seller or a service provider may not be delivered to the user. In this regard, Patent Literature 1 discloses a technique for delivering a message to an addressee by means of a pre-registered alternative means (for example, a facsimile device, a beeper, and so forth) in a case where an e-mail cannot be delivered to the addressee.

CITATION LIST

Patent Literature

Patent Literature 1: JP 2001-237873 A

SUMMARY OF INVENTION

Technical Problem

However, according to the above described technique, pre-registration of an alternative means is required, and when no alternative means is registered in advance, it is not possible to inform a user of the content of an e-mail, and the user thus cannot know the content of the e-mail.

The present invention has been conceived in view of the above, and an object thereof is to provide an e-mail system, a control method for the e-mail system, a relay device, a program, and an information storage medium capable of ensuring that a user can know the content of an e-mail sent addressed to the user even when the e-mail is not delivered to the user.

Solution to Problem

In order to obtain the above described object, an e-mail system according to the present invention is an e-mail system including a relay device for relaying an e-mail sent addressed to a user, wherein the relay device includes e-mail receiving means for receiving an e-mail sent addressed to an alternative mail address that is used instead of an actual mail address of the user so that the relay device receives the e-mail sent addressed to the user; actual mail address obtaining means for obtaining the actual mail address of the user, based on the alternative mail address and information on correlation between the actual mail address and the alternative mail address, in a case where the e-mail sent addressed to the alternative mail address is received; and e-mail sending means for sending, in the case where the e-mail sent addressed to the alternative mail address is received, the e-mail to the actual mail address of the user after setting a predetermined destination as a destination of a notice of failed delivery, if caused, of the e-mail, and the e-mail system includes undelivered mail data saving means for saving, in a case where the notice of failed delivery of the e-mail sent addressed to the actual mail address of the user is received by the predetermined destination, the e-mail, which is failed to be delivered, in undelivered mail data storage means as undelivered mail data; user identification information obtaining means for obtaining user identification information sent from a terminal device used by the user; and undelivered mail data sending means for sending the undelivered mail data to the terminal device, based on content stored in the undelivered mail data storage means, the undelivered mail data being an e-mail sent addressed to the actual mail address of the user relevant to the user identification information obtained by the user identification information obtaining means and failed to be delivered.

A control method for an e-mail system according to the present invention is a control method for an e-mail system including a relay device for relaying an e-mail sent addressed to a user, the control method including an e-mail receiving step of receiving, by the relay device, an e-mail sent addressed to an alternative mail address that is used instead of an actual mail address of the user so that the relay device receives the e-mail sent addressed to the user; an actual mail address obtaining step of obtaining, by the relay device, the actual mail address of the user, based on the alternative mail address and information on correlation between the actual mail address and the alternative mail address, in a case where the e-mail sent addressed to the alternative mail address is received; and an e-mail sending step of sending, by the relay device, in the case where the e-mail sent addressed to the alternative mail address is received, the e-mail to the actual mail address of the user after setting a predetermined destination as a destination of a notice of failed delivery, if caused, of the e-mail, and an undelivered mail data saving step of storing, in a case where the notice of failed delivery of the e-mail sent addressed to the actual mail address of the user is received by the predetermined destination, the e-mail, which is failed to be delivered, in an undelivered mail data storage means as undelivered mail data; a user identification information obtaining step of obtaining user identification information sent from a terminal device used by the user; and an undelivered mail data sending step of sending the undelivered mail data to the terminal device, based on content stored in the undelivered mail data storage means, the undelivered mail data being an e-mail sent addressed to the actual mail address of the user relevant to the user identification information obtained at the user identification information obtaining step and failed to be delivered.

A relay device according to the present invention is a relay device for relaying an e-mail sent addressed to a user, the relay device including: e-mail receiving means for receiving an e-mail sent addressed to an alternative mail address that is used instead of an actual mail address of the user so that the relay device receives the e-mail sent addressed to the user; actual mail address obtaining means for obtaining the actual mail address of the user, based on the alternative mail address and information on correlation between the actual mail address and the alternative mail address, in a case where the e-mail sent addressed to the alternative mail address is received; and e-mail sending means for sending, in the case where the e-mail sent addressed to the alternative mail address is received, the e-mail to the actual mail address of the user after setting a predetermined destination as a destination of a notice of failed delivery, if caused, of the e-mail, and undelivered mail data saving means for saving, in a case where the notice of failed delivery of the e-mail sent addressed to the actual mail address of the user is received by the predetermined destination, the e-mail, which is failed to be delivered, in undelivered mail data storage means as undelivered mail data.

A program according to the present invention is a program for causing a computer to function as a relay device for relaying an e-mail sent addressed to a user, the program for causing the computer to function as: e-mail receiving means for receiving an e-mail sent addressed to an alternative mail address that is used instead of an actual mail address of the user so that the relay device receives the e-mail sent addressed to the user; actual mail address obtaining means for obtaining the actual mail address of the user, based on the alternative mail address and information on correlation between the actual mail address and the alternative mail address, in a case where the e-mail sent addressed to the alternative mail address is received; and e-mail sending means for sending, in the case where the e-mail sent addressed to the alternative mail address is received, the e-mail to the actual mail address of the user after setting a predetermined destination as a destination of a notice of failed delivery, if caused, of the e-mail, and undelivered mail data saving means for saving, in a case where the notice of failed delivery of the e-mail sent addressed to the actual mail address of the user is received by the predetermined destination, the e-mail, which is failed to be delivered, in undelivered mail data storage means as undelivered mail data.

A computer readable information storage medium according to the present invention is a computer readable information storage medium storing a program for causing a computer to function as a relay device for relaying an e-mail sent addressed to a user, the program for causing the computer to function as: e-mail receiving means for receiving an e-mail sent addressed to an alternative mail address that is used instead of an actual mail address of the user so that the relay device receives the e-mail sent addressed to the user; actual mail address obtaining means for obtaining the actual mail address of the user, based on the alternative mail address and information on correlation between the actual mail address and the alternative mail address, in a case where the e-mail sent addressed to the alternative mail address is received; and e-mail sending means for sending, in the case where the e-mail sent addressed to the alternative mail address is received, the e-mail to the actual mail address of the user after setting a predetermined destination as a destination of a notice of failed delivery, if caused, of the e-mail, and undelivered mail data saving means for saving, in a case where the notice of failed delivery of the e-mail sent addressed to the actual mail address of the user is received by the predetermined destination, the e-mail, which is failed to be delivered, in undelivered mail data storage means as undelivered mail data.

According to one aspect of the present invention, the relay device may relay an e-mail sent from a seller of a product or a provider of a service to the user. The user identification information may be identification information for use in identifying a user who buys the product or uses the service. The e-mail system may include means for obtaining content stored in history data storage means for storing history data on history of purchase of the product or use of the service by the user relevant to the user identification information so as to be correlated to the user identification information. The history data may include data indicating the actual mail address of the user, which is used in the purchase of the product or the use of the service by the user. The undelivered mail data may include data indicating the actual mail address of the user, which is a destination of the e-mail failed to be delivered. The undelivered mail data sending means may include means for obtaining the actual mail address of the user, which is used in the purchase of the product or the use of the service by the user relevant to the user identification information, based on the history data stored so as to be correlated to the user identification information obtained by the user identification information obtaining means, and means for sending the undelivered mail data to the terminal device used by the user, the undelivered mail data being an e-mail sent addressed to the obtained actual mail address and failed to be delivered.

According to one aspect of the present invention, the relay device may relay an e-mail sent from a seller of a product or a provider of a service to the user. The user identification information may be identification information for use in identifying a user who buys the product or uses the service. In the case where the notice of failed delivery of the e-mail sent addressed to the actual mail address of the user is received by the predetermined destination, the undelivered mail data saving means may store the e-mail failed to be delivered as the undelivered mail data so as to be correlated to the user identification information of the user in the undelivered mail data storage means. The undelivered mail data sending means may include means for sending the undelivered mail data stored so as to be correlated to the user identification information obtained by the user identification information obtaining means to the terminal device.

According to one aspect of the present invention, the relay device may relay an e-mail sent from a seller of a product or a provider of a service to the user. The user identification information may be identification information for use in identifying a user who buys the product or uses the service. In a case where the notice of failed delivery of the e-mail sent addressed to the actual mail address of the user is received by the predetermined destination, the undelivered mail data saving means may store data including a main text or a header of the e-mail failed to be delivered as the undelivered mail data in the undelivered mail data storage means. The main text or the header of the e-mail failed to be delivered and included in the undelivered mail data stored in the undelivered mail data storage means may include the user identification information of the user who is a destination of the e-mail. The undelivered mail data sending means may include means for obtaining the undelivered mail data, based on the user identification information obtained by the user identification information obtaining means and the user identification information included in the main text or the header of the e-mail failed to be delivered and included in the undelivered mail data stored in the undelivered mail data storage means, the undelivered mail data being the e-mail sent addressed to the actual mail address of the user relevant to the user identification information obtained by the user identification information obtaining means and failed to be delivered, and means for sending the undelivered mail data obtained to the terminal device.

According to one aspect of the present invention, the undelivered mail data may include the actual mail address of the user which is a destination of the e-mail failed to be delivered. The e-mail system may include a means for obtaining content stored in means for storing the actual mail address of the user relevant to the user identification information so as to be correlated to the user identification information. The undelivered mail data sending means may include means for obtaining the actual mail address stored so as to be correlated to the user identification information obtained by the user identification information obtaining means, and means for sending the undelivered mail data including the obtained actual mail address to the terminal device. The e-mail system may include means for changing, in a case where the actual mail address of the user is changed from a first mail address to a second mail address, the actual mail address stored so as to be correlated to the user identification information of the user from the first mail address to the second mail address; and means for changing, in the case where the actual mail address of the user is changed from the first mail address to the second mail address, the actual mail address of the user included in the undelivered mail data stored in the undelivered mail data storage means from the first mail address to the second mail address.

According to one aspect of the present invention, the undelivered mail data may include the actual mail address of the user which is a destination of the e-mail failed to be delivered. The user identification information may be the actual mail address of the user. The user identification information obtaining means may obtain the actual mail address of the user sent from the terminal device as the user identification information. The undelivered mail data sending means may send the undelivered mail data including the actual mail address of the user obtained by the user identification information obtaining means to the terminal device. In a case where the actual mail address of the user is changed from a first mail address to a second mail address, the e-mail system may change the actual mail address of the user included in the undelivered mail data stored in the undelivered mail data storage means from the first mail address to the second mail address.

According to one aspect of the present invention, the undelivered mail data may include the actual mail address of the user which is a destination of the e-mail failed to be delivered. The user identification information may be the alternative mail address of the user. The user identification information obtaining means may obtain the alternative mail address of the user sent from the terminal device as the user identification information. The undelivered mail data sending means may include means for obtaining the actual mail address of the user, based on the alternative mail address of the user obtained by the user identification information obtaining means and the information on the correlation between the actual mail address and the alternative mail address, and means for sending the undelivered mail data including the obtained actual mail address of the user to the terminal device. In a case where the actual mail address of the user is changed from a first mail address to a second mail address, the e-mail system may change the actual mail address of the user included in the undelivered mail data stored in the undelivered mail data storage means from the first mail address to the second mail address.

According to one aspect of the present invention, the e-mail system may further include means for performing, in the case where the notice of failed delivery of the e-mail sent addressed to the actual mail address of the user is received by the predetermined destination, a notice to a sender of the e-mail.

According to one aspect of the present invention, the relay device may relay an e-mail sent from a seller of a product or a provider of a service to the user, and may relay an e-mail sent from the user to the seller or the provider. The e-mail receiving means may include means for receiving an e-mail sent from the seller or the provider to the alternative mail address of the user; and means for receiving an e-mail sent from the user to an alternative mail address that is used instead of an actual mail address of the seller or the provider so that the relay device receives the e-mail sent to the seller or the provider. The actual mail address obtaining means may include means for obtaining, in a case where the e-mail sent from the seller or the provider to the alternative mail address of the user is received, the actual mail address of the user, based on the alternative mail address and the information on the correlation between the actual mail address and the alternative mail address, and means for obtaining, in a case where the e-mail sent from the user to the alternative address of the seller or the provider is received, the actual mail address of the seller or the provider, based on the alternative mail address and the information on the correlation between the actual mail address and the alternative mail address. The e-mail sending means may include first sending means for sending, in the case where the e-mail sent from the seller or the provider to the alternative mail address of the user is received, the e-mail to the actual mail address of the user after setting a predetermined destination as a destination of a notice of failed delivery, if caused, of the e-mail and setting the alternative mail address of the seller or the provider as a source or a reply destination of the e-mail, and second sending means for sending, in the case where the e-mail sent from the user to the alternative address of the seller or the provider is received, the e-mail to the actual mail address of the seller or the provider after setting the alternative mail address of the user as a source or a reply destination of the e-mail.

According to one aspect of the present invention, the user identification information may be identification information for use in identifying a user who purchases the product or uses the service. The e-mail system may include means for obtaining content stored in history data storage means for storing history data on history of purchase of the product or use of the service by the user relevant to the user identification information, so as to be correlated to the user identification information. The second sending means may include information adding means for adding, in the case where the e-mail sent from the user to the alternative address of the seller or the provider is received, information obtained based on the history data stored so as to be correlated to the user identification information of the user to a main text or a header of the e-mail, and means for sending the e-mail having the information added thereto to the actual mail address of the seller or the provider after setting the alternative mail address of the user as the source or the reply destination of the e-mail.

According to one aspect of the present invention, the predetermined destination may be the relay device, and the relay device may include the undelivered mail data saving means.

Advantageous Effects of Invention

According to the present invention, even when an e-mail addressed to a user is not delivered to the user, it is possible to ensure that the user can know the content of the undelivered e-mail.

BRIEF DESCRIPTION OF DRAWINGS

FIG. 3 is a diagram showing one example of a purchase history screen;

FIG. 4 is a diagram showing one example of an undelivered mail list screen;

FIG. 5 is a diagram showing one example of an undelivered mail detail screen;

FIG. 6 is a diagram showing one example of a user table;

FIG. 7 is a diagram showing one example of a shop table;

FIG. 8 is a diagram showing one example of a transaction history table;

FIG. 11 is a functional block diagram of an e-commerce system according to the first embodiment;

FIG. 17 is a diagram showing one example of the undelivered mail table;

FIG. 18 is a diagram showing one example of the undelivered mail table;

FIG. 19 is a diagram showing another example of the shop table;

FIG. 20 is a diagram showing one example of the source and destination information of an e-mail;

FIG. 23 is a functional block diagram of an e-commerce system according to a second embodiment.

DESCRIPTION OF EMBODIMENTS

In the following, examples of embodiments of the present invention will be described in detail with reference to the drawings. Specifically, a case in which the present invention is applied to an e-commerce system will be described. That is, an example of a case in which an e-mail system according to an embodiment of the present invention is implemented in an e-commerce system for implementing a virtual shopping mall including a plurality of shops will be described.

[First Embodiment]

Figure 1:
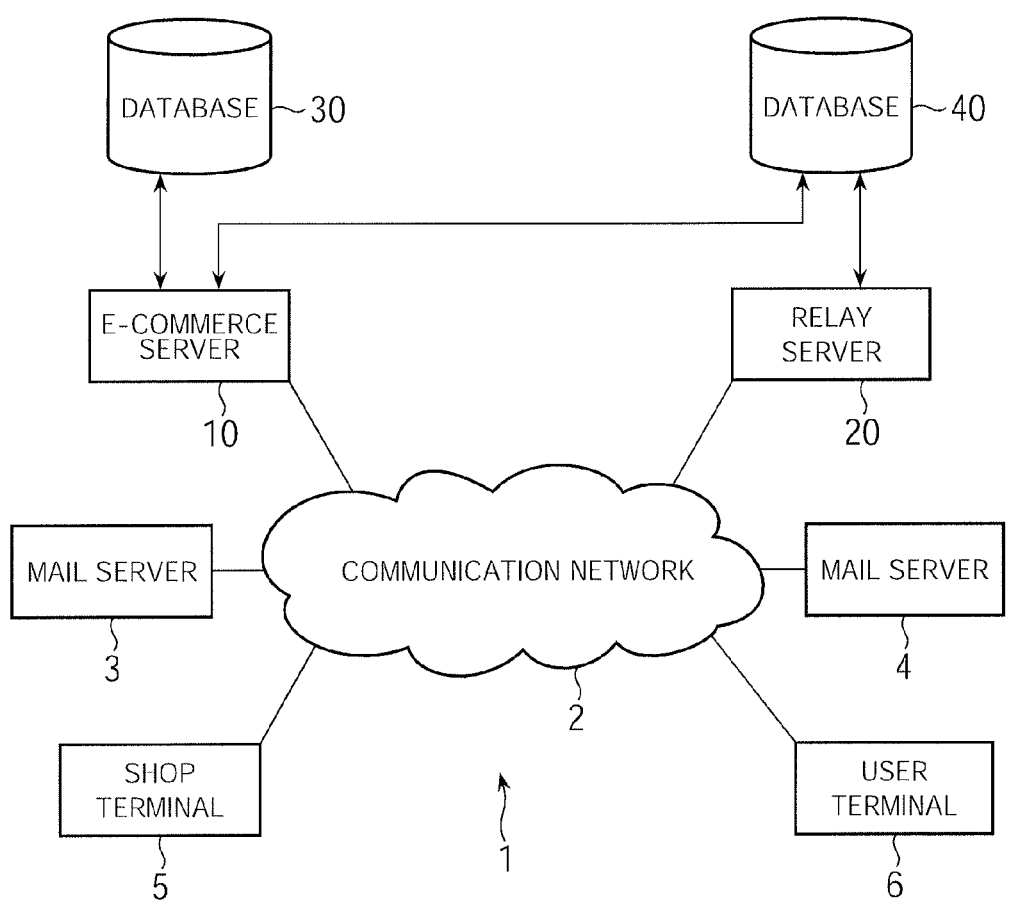
FIG. 1 is a diagram showing an overall structure of an e-commerce system according to a first embodiment.

FIG. 1 shows an overall structure of an e-commerce system according to a first embodiment of the present invention. As shown in FIG. 1, an e-commerce system 1 according to the first embodiment includes an e-commerce server 10, a relay server 20 (a relay device), databases 30, 40, mail servers 3, 4, a shop terminal 5, and a user terminal 6. Although not shown in FIG. 1, in actuality, a plurality of shop terminals 5 and a plurality of user terminals 6 are included. The e-commerce server 10, the relay server 20, the mail servers 3, 4, the shop terminal 5, and the user terminal 6 are connected to a communication network 2 including, for example, the Internet or the like, and can communicate via data between one another.

The e-commerce server 10 is a server that functions as, for example, a portal of the virtual shopping mall. For example, the e-commerce server 10 includes a control unit (for example, a CPU, or the like) that executes processing according to a program, a main memory unit (for example, a RAM, or the like), an auxiliary storage unit (for example, a hard disk), an optical disk drive for reading a program and data stored in an optical disk (an information storage medium), and a communication interface. The e-commerce server 10 executes processing based on a processing request received from the shop terminal 5 or the user terminal 6.

The e-commerce server 10 can access the database 30. In the database 30, for example, data on a user using the virtual shopping mall, data on a shop open in the virtual shopping mall, data on a product dealt in the virtual shopping mall, data on history of transactions performed in the virtual shopping mall, and so forth are stored. The database 30 may be built in a server different from the e-commerce server 10 or in the e-commerce server 10. The relay server 20 as well may access the database 30.

The shop terminal 5 is an information processing device provided on the shop side in the virtual shopping mall. The shop terminal 5 is, for example, a personal computer, or the like. For example, a dedicated screen provided by the e-commerce server 10 is displayed in the shop terminal 5. In the dedicated screen, a person in charge from a shop can register information on a product for selling in the virtual shopping mall, or the like, and check a product purchase situation.

The user terminal 6 is an information processing device for operation by a user. The user terminal 6 is, for example, a portable phone, a personal digital assistant (PDA), a personal computer, or the like. The user terminal 6 is used to buy a product in the virtual shopping mall.

In this embodiment, for example, an HTTP daemon is activated in the e-commerce server 10. A browser is activated in the shop terminal 5 or the user terminal 6, and a processing request (HTTP request) is sent from the shop terminal 5 or the user terminal 6 via the browser to the e-commerce server 10. Then, a processing result (HTTP response) in response to the above-described processing request is sent from the e-commerce server 10 to the shop terminal 5 or the user terminal 6. For example, page data written in a web page descriptive language is sent to the shop terminal 5 or the user terminal 6. Then, based on the page data, a screen based on the processing result is displayed on the display unit equipped to the shop terminal 5 or the user terminal 6.

The mail servers 3, 4 are general mail servers for sending and receiving an e-mail. The mail servers 3, 4 may be provided by a company running the virtual shopping mall or by a company different from the company running the virtual shopping mall. The following description is based on an assumption that a shop uses the mail server 3, and that a user uses the mail server 4. It is not necessary that all shops in the virtual shopping mall use the same mail server, and each shop may use any mail server. Similarly, it is not necessary that all users use the same mail server, and each user may use any mail server.

The relay server 20 is a server for relaying an e-mail to be exchanged between a shop and a user. Similar to the e-commerce server 10, the relay server 20 includes, for example, a control unit, a main memory unit, an auxiliary storage unit, an optical disk drive, and a communication interface. The relay server 20 is managed by a company running the virtual shopping mall.

The relay server 20 can access the database 40. Data for relaying an e-mail is stored in the database 40. The database 40 may be built in a server different from the relay server 20 or in the relay server 20. The e-commerce server 10 as well can access the database 40.

Below, a flow of buying a product in the virtual shopping mall will be described. A user wishing to buy a product in the virtual shopping mall accesses the e-commerce server 10 from the user terminal 6. For example, the user inputs his/her user ID and password to complete logging in the e-commerce system 1, and then looks for a product or selects a product category to find his/her desired product.

Figure 2:
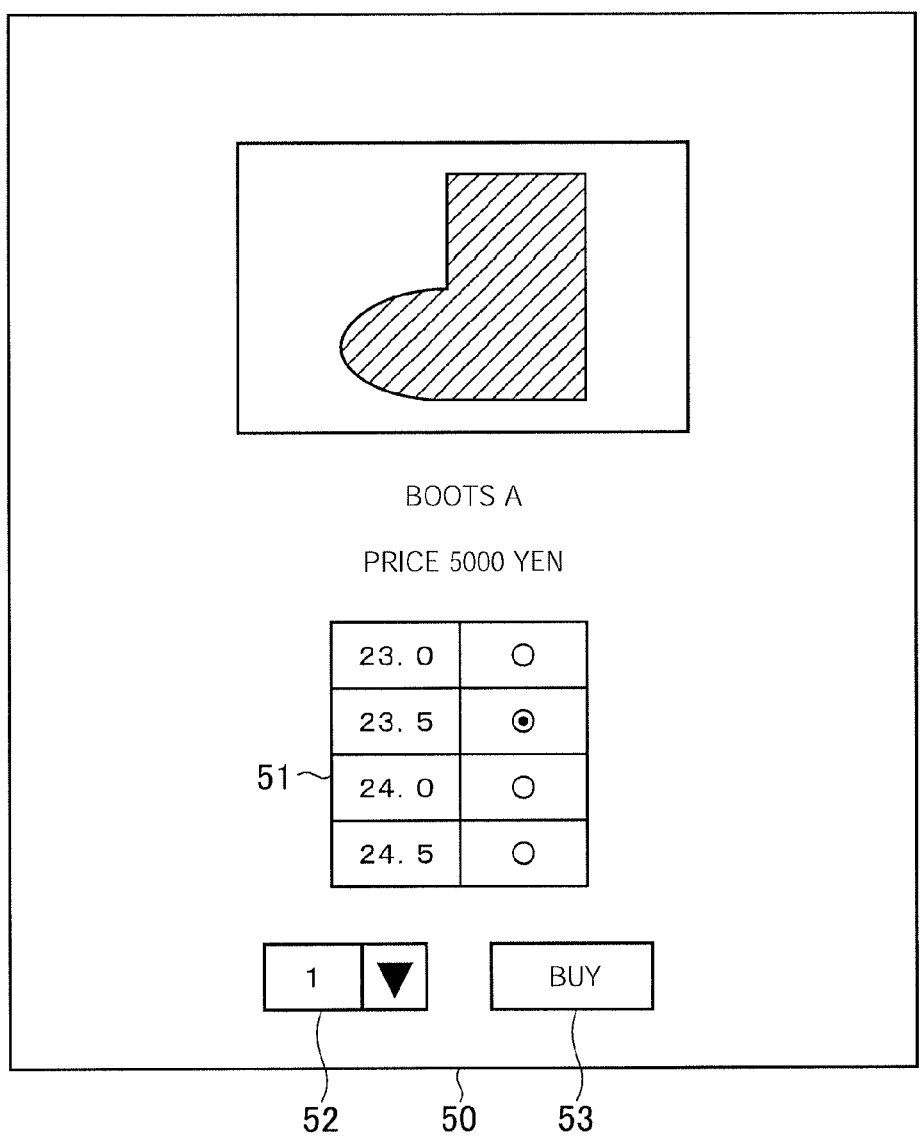
FIG. 2 is a diagram showing one example of a product screen.

FIG. 2 shows one example of a product screen displayed on a display unit of the user terminal 6. A product name, a product image, and a product price are shown in the product screen 50 shown in FIG. 2. The product screen 50 shown in FIG. 2 is a screen for buying "boots A". A user buying a product selects his/her desired size and number of items in the size selection box 51 and the number selection box 52, respectively, and then clicks the buy button 53. With the buy button 53 clicked, a purchase screen (not shown) for a purchase procedure is displayed on the display unit of the user terminal 6. The user proceeds the purchase procedure in the purchase screen.

With a product purchased, information on the user having purchased the product (for example, a name, an address, a mail address, and so forth) is informed to the shop. The shop then sends an e-mail to the user to inform of acceptance of the product order, a shipping schedule, and so forth.

Note that, however, there may be a case in which the e-mail from the shop is not delivered to the user for a variety of reasons. Such a case may include, for example, a case where mail rejection has been set by the user and a case where the user has changed his/her mail address. In such a case, the e-mail from the shop may not be delivered to the user. With no e-mail from the shop delivered to the user, the user cannot confirm whether or not his/her order has been duly accepted by the shop and cannot know a shipping schedule, and may thus feel unsatisfied.

Regarding this point, the e-commerce system 1 has a function for ensuring that a user can know the content of an e-mail from a shop even when the e-mail fails to be delivered to the user. In the following, this function will be described.

For the e-commerce system 1, an e-mail sent from a shop to a user and failed to be delivered to the user (hereinafter referred to as "an undelivered mail") is saved, and the user can see the undelivered mail by accessing the e-commerce server 10.

Specifically, the user can check an undelivered mail by accessing a purchase history screen. FIG. 3 shows one example of the purchase history screen displayed on the display unit of the user terminal 6. The purchase history screen is a screen that is displayed, for example, upon click by a user on a predetermined link button in a top screen (not shown), or the like, after completing logging in the e-commerce system 1. A purchase history list 61 is displayed in the purchase history screen 60 shown in FIG. 3. The purchase history list 61 shows a list of products having been purchased by the user so far. The purchase history list 61 includes a link button 62 displayed so as to be correlated to each purchase. With the link button 62 clicked, a screen (not shown) showing detail information on the purchase is displayed.

A link button 63 for showing an undelivered mail list is also displayed in the purchase history screen 60 shown in FIG. 3. With the link button 63 clicked, an undelivered mail list screen is displayed on the display unit of the user terminal 6.

FIG. 4 shows one example of the undelivered mail list screen. An undelivered mail list 71 is displayed in the undelivered mail list screen 70 shown in FIG. 4. In the undelivered mail list 71, a title, a mail address of a shop that is a source (sender), a mail address of a user who is a destination (addressee), and a sending time and date are displayed as information on each undelivered mail. Further, in the undelivered mail list 71, a link button 72 is displayed so as to be correlated to each undelivered mail. The link button 72 is a link button for displaying the content of a concerned undelivered mail. Note that a link button 73 for returning to the purchase history screen 60 is also displayed in the undelivered mail list screen 70.

In order to check the content of an undelivered mail, a user clicks the link button 72 displayed so as to be correlated to his/her desired undelivered mail. With the link button 72 clicked, an undelivered mail detail screen is displayed on the display unit of the user terminal 6.

FIG. 5 shows one example of the undelivered mail detail screen. In the undelivered mail detail screen 80 shown in FIG. 5, basic information 81 and content 82 of the undelivered mail selected in the undelivered mail list screen 70 are displayed. For example, the header and main text of the undelivered mail are displayed as the content 82 of the undelivered mail. Note that a link button 83 for returning to the undelivered mail list screen 70 is also displayed in the undelivered mail detail screen 80.

As described above, in the e-commerce system 1, even when an e-mail sent from a shop to a user is not delivered, the user can know the content of the e-mail by referring to the undelivered mail list screen 70 and the undelivered mail detail screen 80. In the following, a structure for achieving this function will be described.

Initially, data stored in the database 30 will be described. FIGS. 6, 7, and 8 show one example of the data stored in the database 30.

FIG. 6 shows one example of a user table. Information on a user using the virtual shopping mall is registered in the user table. The user table shown in FIG. 6 includes "user ID", "name", "address", "actual mail address", and "alternative mail address" fields. A user ID for uniquely identifying a user is registered in the "user ID" field. The name and address of a user are registered in the "name" and "address" fields. Although not shown in FIG. 6, the user table further includes a "password" field or the like for storing a password of a user.

The actual mail address of a user is registered in the "actual mail address" field. The alternative mail address of a user is registered in the "alternative mail address" field. An "actual mail address" is a mail address specified by a user himself/herself as a mail address for receiving a mail from a company running the virtual shopping mall or a shop in the virtual shopping mall. Meanwhile, an "alternative mail address" is a mail address set for a user by the e-commerce system 1, separately from the mail address specified by the user himself/herself.

In the e-commerce system 1, when informing a shop of user information, the alternative mail address is informed to the shop as a mail address of the user, with the actual mail address not informed to the shop. Thus, an e-mail from the shop to the user is sent addressed to the alternative mail address of the user. The alternative mail address is a mail address managed by the relay server 20, and the e-mail sent addressed to the alternative mail address is thus sent to the relay server 20.

FIG. 7 shows one example of the shop table. Information on a shop open in the virtual shopping mall is registered in the shop table. The shop table shown in FIG. 7 includes "shop ID", "shop name", and "mail address" fields. A shop ID for uniquely identifying a shop is registered in the "shop ID" field. A shop name and a shop mail address are registered in the "shop name" and "mail address" fields, respectively.

FIG. 8 shows one example of a transaction history table. History of transactions performed with respect to the virtual shopping mall is registered in the transaction history table. The transaction history table shown in FIG. 8 includes "order number", "user ID", "user mail address", "shop ID", "shop mail address", "time and date", "product ID", "number of items", and "price" fields.

An order number for uniquely identifying an order from a user is registered in the "order number" field. The user ID of a user having ordered a product is registered in the "user ID" field; an actual mail address of the user in ordering the product is registered in the "user mail address" field. The shop ID of a shop that sells the product is registered in the "shop ID" field; a mail address of the shop that sells the product is registered in the "shop mail address" field. Time and date at which to receive the order from the user is registered in the "time and date" field. The product ID of the product ordered by the user is registered in the "product ID" field. Detail information on each product is registered in a product table (not shown). The number of products ordered by the user is registered in the "number of items" field; the amount of money to be paid by the user is registered in the "price" field.

Figures 9, 10A, 10B:
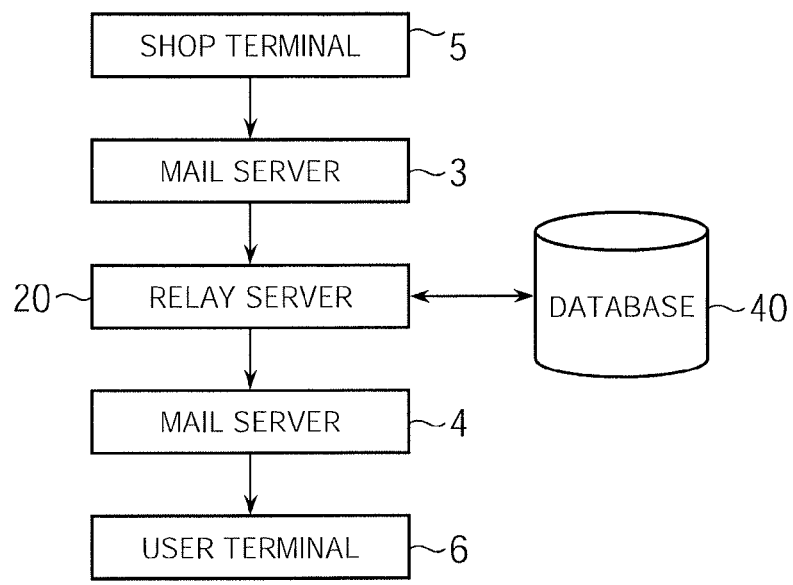
FIG. 9 is a diagram showing a flow of sending an e-mail from a shop to a user.
FIG. 10A is a diagram showing one example of source and destination information of an e-mail.
FIG. 10B is a diagram showing one example of source and destination information of an e-mail.

Below, a flow of sending an e-mail from a shop to a user in the e-commerce system 1 will be described. FIG. 9 explains a flow of sending an e-mail from a shop to a user. FIGS. 10A and 10B explain change in the source and destination information of the e-mail from the shop during a process before delivery of the e-mail to the user terminal 6. In FIGS. 10A and 10B, assume a case in which an e-mail is sent from a shop with shop ID "S0001" to a user with user ID "U0001".

In FIGS. 10A and 10B, "Envelop From" indicates source information attached to the main body (main text and header) of the e-mail; "Envelop To" indicates destination information attached to the main body of the e-mail. The e-mail is delivered based on "Envelop From" and "Envelop To". Specifically, "From" indicates source information held in the header of the e-mail; "To" indicates destination information held in the header of the e-mail.

The e-mail from the shop to the user is sent from the shop terminal 5 via the mail server 3. FIG. 10A shows the source and destination information of the e-mail sent from the mail server 3. As shown in FIG. 10A, in "Envelop From" and "From", the mail address of a shop that is the source of the e-mail is set; in "Envelop To" and "To", the mail address of a user that is the destination of the e-mail is set. Specifically, the alternative mail address of the user is set in "Envelop To" and "To" as the alternative mail address is informed to the shop as the mail address of the user, as described above.

As the alternative mail address is a mail address managed by the relay server 20, the e-mail having the alternative mail address of the user set as the destination (Envelop To) is sent to the relay server 20.

In the relay server 20, when the e-mail having the alternative mail address of the user set as the destination is received, the e-mail is sent addressed to the actual mail address of the user. FIG. 10B shows the source and destination information of the e-mail sent from the relay server 20.

As shown in FIG. 10B, the mail address of a shop that is the original source (original sender) is set in "From". Meanwhile, a predetermined mail address managed by the relay server 20 is set in "Envelop From". This mail address is a mail address for receiving a notice of failed delivery, if caused, of the e-mail. That is, when the e-mail is failed to be delivered, the failed delivery of the e-mail is notified to the mail address set in "Envelop From". As "Envelop From" is set as described above, failed delivery, if caused, of the e-mail is notified to the relay server 20.

Meanwhile, the actual mail address of the user is set in "Envelop To" and "To". As the actual mail address is a mail address managed by the mail server 4, the e-mail having the actual mail address of the user set as the destination (Envelop To) is sent to the mail server 4.

In the mail server 4, when the e-mail sent addressed to the actual mail address of the user is received, that e-mail is stored. Then, when a receipt request for an e-mail sent addressed to the user is sent from the user terminal 6 to the mail server 4, the mail server 4 sends the received e-mail addressed to the user to the user terminal 6. In this manner, the e-mail from the shop to the user is delivered to the user terminal 6.

Note that, as described above, in a case where an e-mail sent from the relay server 20 is not delivered, a notice of failed delivery is sent to the relay server 20. Specifically, a message to inform of the failed delivery is sent to the relay server 20 together with the undelivered e-mail (main text and header). Then, the relay server 20 saves the data on the undelivered e-mail in the database 40. As the undelivered e-mail is saved in the database 40, it is possible to ensure that the user can know the content of the e-mail from the shop even when the e-mail is failed to be delivered to the user.

Below, a structure for saving an undelivered e-mail from a shop to a user and a structure for presenting the undelivered mail to the user will be described in detail.

FIG. 11 is a functional block diagram showing a functional block relevant to the present invention among those achieved in the e-commerce system 1. As shown in FIG. 11, the e-commerce system 1 includes an e-mail receiving unit 200, an actual mail address obtaining unit 210, an e-mail sending unit 220, an undelivered mail data saving unit 230, a mail address storage unit 400, an undelivered mail data storage unit 410, a user identification information obtaining unit 100, and an undelivered mail data sending unit 110.

For example, the e-mail receiving unit 200, the actual mail address obtaining unit 210, the e-mail sending unit 220, and the undelivered mail data saving unit 230 are implemented in the relay server 20. The mail address storage unit 400 and the undelivered mail data storage unit 410 are implemented in the database 40; the user identification information obtaining unit 100 and the undelivered mail data sending unit 110 are implemented in the e-commerce server 10.

Note that the e-mail receiving unit 200, the actual mail address obtaining unit 210, the e-mail sending unit 220, and the undelivered mail data saving unit 230 are functional blocks for saving an undelivered mail. Meanwhile, the user identification information obtaining unit 100 and the undelivered mail data sending unit 110 are functional blocks for presenting an undelivered mail to a user.

The e-mail receiving unit 200 receives a mail sent addressed to the alternative mail address.

When the e-mail addressed to the alternative mail address is received, the actual mail address obtaining unit 210 obtains the actual mail address correlated to the alternative mail address, based on the alternative address and information on correlation between the alternative mail address and the actual mail address.

Figures 12, 13, 14:
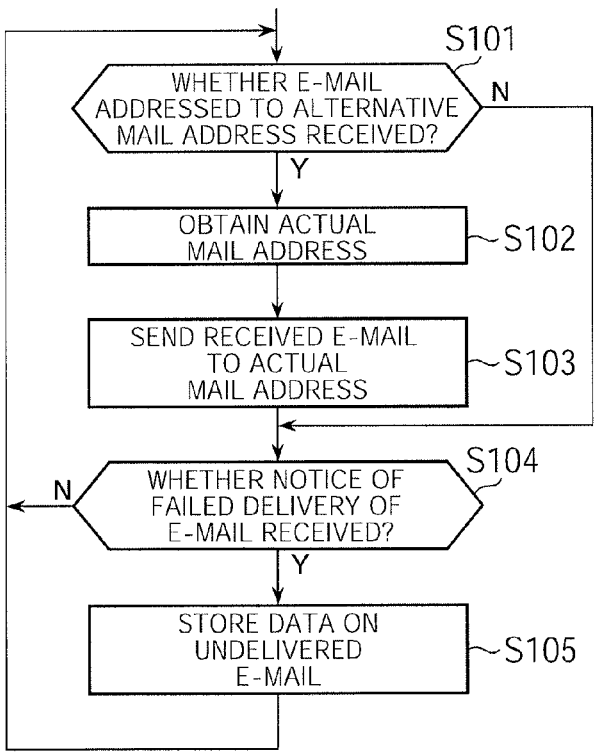
FIG. 12 is a diagram showing one example of a mail address table.
FIG. 13 is a diagram showing one example of an undelivered mail table.
FIG. 14 is a diagram showing one example of processing executed in the e-commerce system according to the first embodiment.

For example, the actual mail address obtaining unit 210 obtains the actual mail address correlated to the alternative mail address, based on the content stored in the mail address storage unit 400. FIG. 12 shows one example of a mail address table stored in the mail address storage unit 400. In the mail address table shown in FIG. 12, the actual mail address and alternative mail address of a user are stored so as to be correlated to each other. The actual mail address obtaining unit 210 obtains the actual mail address stored so as to be correlated to the alternative mail address, by referring to the mail address table.

Note that as the actual mail address and alternative mail address of a user are stored so as to be correlated to each other also in the user table stored in the database 30, the actual mail address obtaining unit 210 may refer to the user table instead.

Alternatively, when an actual mail address and an alternative mail address have such a relationship that the alternative mail address can be obtained by converting the actual mail address according to a predetermined rule, and the actual mail address can be obtained by converting the alternative mail address according to a predetermined rule, the actual mail address obtaining unit 210 may convert the alternative mail address according to a predetermined rule to thereby obtain the actual mail address. In this case, the "predetermined rule" corresponds to the above mentioned "information on correlation between the alternative mail address and the actual mail address".

The e-mail sending unit 220 sends the e-mail received by the e-mail receiving unit 200 to the actual mail address obtained by the actual mail address obtaining unit 210 after setting a predetermined destination (addressee) as a destination (an addressee) of a notice of failed delivery, if caused, of the e-mail. As described above, in this embodiment, the source and destination information of an e-mail is set such that the relay server 20 is notified of failed delivery, if caused, of the e-mail (see FIG. 10B). That is, the relay server 20 corresponds to the "predetermined destination" in this embodiment.

When the notice of failed delivery of the e-mail sent addressed to the actual mail address obtained by the actual mail address obtaining unit 210 is received by the predetermined destination (the relay server 20 in this embodiment), the undelivered mail data saving unit 230 saves undelivered mail data indicating the undelivered e-mail in the undelivered mail data storage unit 410.

FIG. 13 shows one example of an undelivered mail table stored in the undelivered mail data storage unit 410. An undelivered e-mail is registered in the undelivered mail table. The undelivered mail table shown in FIG. 13 includes "mail ID", "title", "source", "destination", "sending time and date", and "mail body" fields.

A mail ID for uniquely identifying an e-mail is registered in the "mail ID" field. The title of an e-mail is registered in the "title" field. The mail address set in "From" of an e-mail is registered in the "source" field; the mail address set in "To" of the e-mail is registered in the "destination" field. The sending time and date of an e-mail is registered in the "sending time and date" field. The main body (main text and header) of an e-mail is registered in the "mail body" field. Note that as information registered in the "title", "source", "destination", "sending time and date" fields are included in the main body (main text and header) of an e-mail, these fields may be omitted.

The undelivered mail data saving unit 230 registers an undelivered e-mail in the undelivered mail table. In this case, each record in the undelivered mail table corresponds to the above-described "undelivered mail data".

The user identification information obtaining unit 100 obtains user identification information that is sent from a terminal device used by a user. In this embodiment, for example, the user terminal 6 corresponds to the above-described "terminal device used by a user"; the user ID corresponds to the above-described "user identification information". For example, the user identification information obtaining unit 100 obtains a user ID that is sent from the user terminal 6 upon click on the link button 63 in the purchase history screen 60.

Note that the "terminal device used by a user" is not limited to a terminal device owned by the user. That is, a user may use a terminal device owned by a person other than the user himself/herself, and in this case, the terminal device corresponds to the "terminal device used by a user". Further, it may be arranged such that the actual mail address or alternative mail address of a user correspond to the "user identification information". This aspect will be described later.

Based on the content stored in the undelivered mail data storage unit 410, the undelivered mail data sending unit 110 sends undelivered mail data indicating "an e-mail sent addressed to the actual mail address of a user relevant to a user identification information obtained by the user identification information obtaining unit 100 and failed to be delivered" to the terminal device used by the user. In this embodiment, the undelivered mail data sending unit 110 sends screen data on the undelivered mail list screen 70 or the undelivered mail detail screen 80 to the user terminal 6.

The above described e-mail receiving unit 200, the actual mail address obtaining unit 210, the e-mail sending unit 220, and the undelivered mail data saving unit 230 are implemented by the control unit of the relay server 20 executing processing according to a program. FIG. 14 is a flowchart showing one example of processing executed by the control unit of the relay server 20 to implement the above-described functional block. The control unit of the relay server 20 executes the processing shown in FIG. 14 according to a program stored in the auxiliary storage unit or the optical disk (an information storage medium), thereby functioning as the above-described functional block.

As shown in FIG. 14, the control unit (the e-mail receiving unit 200) of the relay server 20 determines whether or not an e-mail sent addressed to the alternative mail address has been received (S101). When the e-mail sent addressed to the alternative mail address has not been received, the control unit of the relay server 20 executes the processing at step S104 to be described later. Meanwhile, when the e-mail sent addressed to the alternative mail address has been received, the control unit (the actual mail address obtaining unit 210) of the relay server 20 obtains the actual mail address correlated to the alternative mail address (S102). For example, the control unit obtains the actual mail address correlated to the alternative mail address, by referring to the mail address table (FIG. 12).

After obtaining the actual mail address, the control unit (the e-mail sending unit 220) of the relay server 20 sends the e-mail received at step S101 to the actual mail address (S103). In this case, the control unit changes "Envelop To" and "To" to the actual mail address obtained at step S102 (FIG. 10B). In addition, the control unit changes "Envelop From" to a predetermined mail address (a mail address for receiving a notice of failed delivery of an e-mail) managed by the relay server 20 (FIG. 10B).

Then, the control unit of the relay server 20 determines whether or not a notice of failed delivery of the e-mail sent addressed to the actual mail address has been received (S104). When such a notice has been received, the control unit (the undelivered mail data saving unit 230) of the relay server 20 saves data on the undelivered e-mail in the database 40 (S105).

Specifically, for example, the control unit adds a new record to the undelivered mail table (FIG. 13), and then registers a mail ID that is not identical to any extent mail ID in the "mail ID" field of the newly added record. Further, the control unit registers the title of the undelivered e-mail in the "title" of the newly added record. Similarly, the control units registers the mail addresses set in "From" and "To" of the undelivered e-mail in the "source" and "destination" fields of the newly added record, and further, the sending a time and date and mail body of the undelivered e-mail in the "sending time and date" and "mail body" fields, respectively, of the newly added record.

Meanwhile, when it is not determined at step S104 that the above-described notice has been received or when the processing at step S105 is executed, the control unit of the relay server 20 executes again the processing at step S101.

Figure 15:
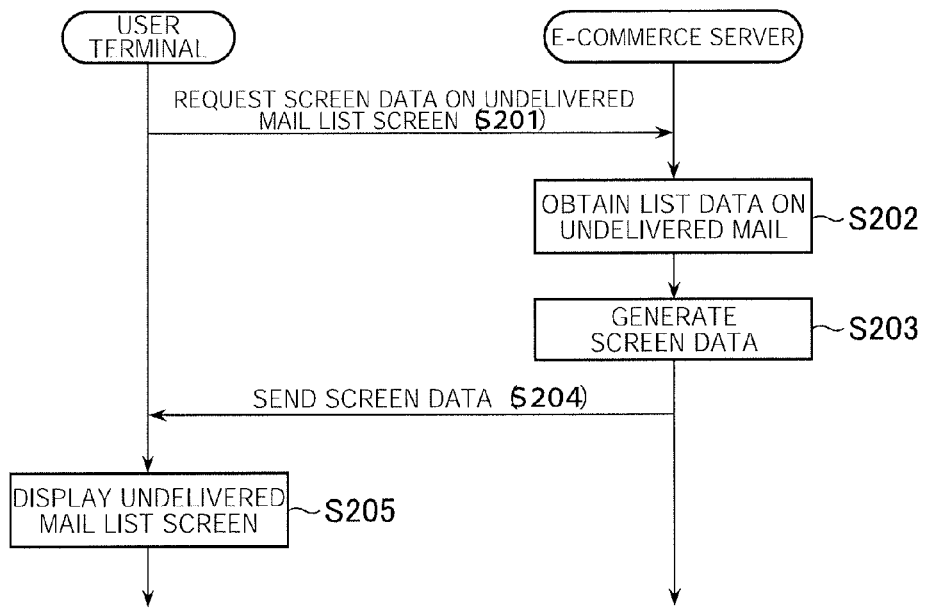
FIG. 15 is a diagram showing one example of processing executed in the e-commerce system according to the first embodiment.
Figure 16:
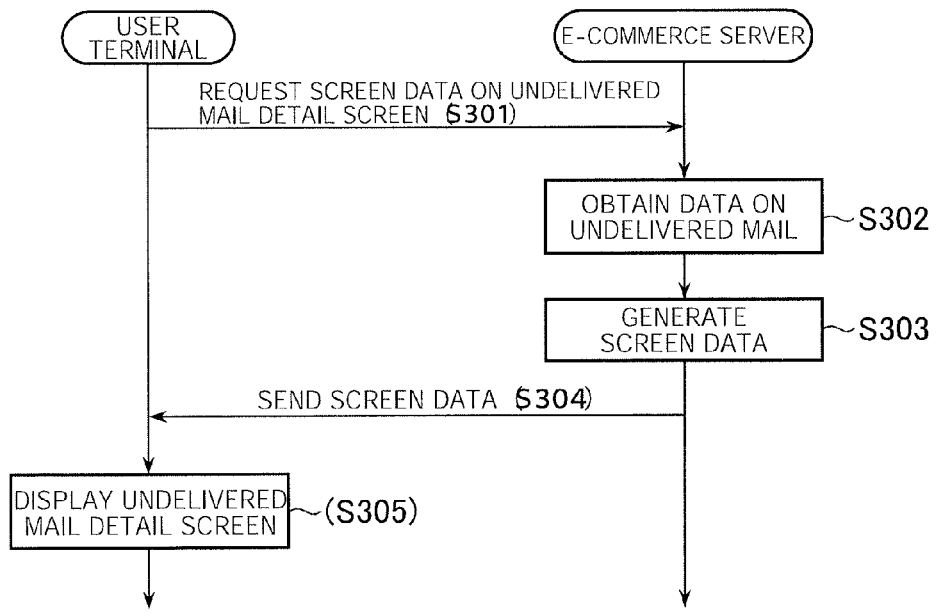
FIG. 16 is a diagram showing one example of processing executed in the e-commerce system according to the first embodiment.

The above described user identification information obtaining unit 100 and the undelivered mail data sending unit 110 are implemented by the control unit of the e-commerce server 10 executing processing according to a program. FIGS. 15 and 16 show a flowchart of processing executed by the control unit of the e-commerce server 10 to implement the user identification information obtaining unit 100 and the undelivered mail data sending unit 110. The processing shown in FIG. 15 is processing that is executed upon click on the link button 63 in the purchase history screen 60. FIG. 16 shows processing that is executed upon click on the link button 72 in the undelivered mail list screen 70. The control unit of the e-commerce server 10 executes the processing shown in FIG. 15 or 16 according to a program stored in the auxiliary storage unit or the optical disk (an information storage medium), thereby functioning as the user identification information obtaining unit 100 and the undelivered mail data sending unit 110.

Initially, the processing shown in FIG. 15 will be described. Upon click on the link button 63 in the purchase history screen 60, the control unit of the user terminal 6 requests of the e-commerce server 10 the screen data on the undelivered mail list screen 70 (S201). Note that the purchase history screen 60 is set such that the user ID of a user is sent to the e-commerce server 10 upon click on the link button 63. That is, a user ID is correlated to the link button 63, and sent to the e-commerce server 10 upon click on the link button 63.

Specifically, for example, the URL of the undelivered mail list screen 70 is correlated to the link button 63, and a user ID is correlated as an argument to the URL of the undelivered mail list screen 70, so that the user ID is sent to the e-commerce server 10 upon click on the link button 63. Alternatively, a user ID is set in a hidden field in the purchase history screen 60, and the user ID set in the hidden field is sent to the e-commerce server 10 upon click on the link button 63.

Then, the control unit (the user identification information obtaining unit 100) of the e-commerce server 10 obtains the user ID sent together with the above-described request. The control unit also obtains list data of an undelivered mail having a user identified by the obtained user ID set as a destination (an addressee) (S202). Specifically, for example, the control unit accesses the transaction history table (FIG. 8) to search a record having the received user ID set in the "user ID" field thereof, and then obtains the mail address registered in the "user mail address" field of the found record. Thereafter, the control unit then accesses the undelivered mail table (FIG. 13) to search a record having the obtained mail address registered in the "destination" field thereof, and then obtains the found record as the undelivered mail list data. That is, data registered in the respective "mail ID", "title", "source", "destination", "sending time and date", and "mail body" fields of the found record are obtained as list data of an undelivered mail.

After execution of the processing at step S202, the control unit of the e-commerce server 10 generates screen data on the undelivered mail list screen 70, based on the data obtained at step S202 (S203). The screen data on the undelivered mail list screen 70 is set such that the mail ID of an undelivered mail correlated to the link button 72 in the undelivered mail list screen 70 is sent to the e-commerce server 10 upon click on the link button 72. For example, the screen data on the undelivered mail list screen 70 is set such that a mail ID is correlated to the link button 72 and sent to the e-commerce server 10 upon click on the link button 72.

After generation of the screen data on the undelivered mail list screen 70, the control unit (the undelivered mail data sending unit 110) sends the screen data to the user terminal 6 (S204). In the user terminal 6, having received the screen data, the undelivered mail list screen 70 is displayed on the display unit based on the screen data (S205).

Below, the processing shown in FIG. 16 will be described. When the link button 72 in the undelivered mail list screen 70 is clicked, the control unit of the user terminal 6 requests of the e-commerce server 10 the screen data on the undelivered mail detail screen 80 (S301). The undelivered mail list screen 70 is set such that the mail ID of an undelivered mail correlated to the link button 72 is sent to the e-commerce server 10 upon click on the link button 72, as described above. For example, a mail ID is correlated to the link button 72, and sent to the e-commerce server 10 upon click on the link button 72.

Having received the above-described request, the control unit of the e-commerce server 10 obtains data on an undelivered mail identified by the mail ID received together with the request (S302). That is, the control unit accesses the undelivered mail table (FIG. 13) to search a record having the received mail ID registered in the "mail ID" field thereof, and then obtains the found record as the above-described data.

After execution of the processing at step S302, the control unit of the e-commerce server 10 generates screen data on the undelivered mail detail screen 80 based on the data obtained at step S302 (S303). Then, the control unit sends the screen data to the user terminal 6 (S304). In the user terminal 6, having received the screen data, the undelivered mail detail screen 80 is displayed on the display unit based on that screen data (S305).

According to the e-commerce system 1 described above, it is possible to ensure that a user can know the content of an e-mail sent from a shop to the user even when the e-mail is failed to be delivered.

Further, according to the e-commerce system 1, in obtaining an undelivered mail to be shown in the undelivered mail list screen 70 (step S202 in FIG. 15), an actual mail address having been used by a user in the past in purchasing a product is obtained from the transaction history table, and an undelivered mail is obtained from the undelivered mail table (FIG. 13), based on the actual mail address. In this manner, even when the actual mail address of the user has been changed, it is possible to show an undelivered mail before the change to the actual mail address (an undelivered mail addressed to the actual mail address before the change) in the undelivered mail list screen 70 and the undelivered mail detail screen 80.

Below, a modified example of the e-commerce system 1 according to the first embodiment will be described.

(1) For example, when the actual mail address of a user is changed, the actual mail address of the user stored in the undelivered mail table (FIG. 13) may also be changed.

For example, assume a case in which the actual mail address of a user with user ID "U0001" is changed from "taro@aaa.jp" (a first mail address) to "yamada@ddd.jp" (a second mail address). In this case, "taro@aaa.jp" registered in the "actual mail address" field in the user table (FIG. 6) is changed to "yamada@ddd.jp". Further, "taro@aaa.jp" registered in the "actual mail address" field in the mail address table (FIG. 12) is also changed to "yamada@ddd.jp".

Further, in this case, "taro@aaa.jp" registered in the "destination" field in the undelivered mail table may also be changed to "yamada@ddd.jp".

Still further, in this case, in obtaining an undelivered mail to be shown in the undelivered mail list screen 70 (step S202 in FIG. 15), the actual mail address of a user may be obtained based on the user table and the user ID that is sent from the user terminal 6 upon click on the link button 63 in the purchase history screen 60, and further, an undelivered mail may be obtained from the undelivered mail table (FIG. 13), based on the actual mail address. That is, a record having the obtained actual mail address registered in the "destination" field thereof may be obtained from the undelivered mail table.

In the above described manner as well, even when the actual mail address of a user has been changed, it is possible to show an undelivered mail before the change to the actual mail address in the undelivered mail list screen 70 and the undelivered mail detail screen 80.

Note here that although it has been described in the above that the purchase history screen 60 is set such that the user ID of a user (user identification information) is sent to the e-commerce server 10 upon click on the link button 63, the purchase history screen 60 may be set such that the actual mail address of a user (user identification information) is sent to the e-commerce server 10 upon click on the link button 63. That is, the actual mail address of a user may be correlated to the link button 63, and is sent to the e-commerce server 10 upon click on the link button 63.

In this case, in obtaining an undelivered mail to be shown in the undelivered mail list screen 70 (step S202 in FIG. 15), an undelivered mail may be obtained from the undelivered mail table (FIG. 13), based on the actual mail address of a user which is sent from the user terminal 6 upon click on the link button 63 in the purchase history screen 60.

Alternatively, the purchase history screen 60 may be set such that the alternative mail address of a user (user identification information) is sent to the e-commerce server 10 upon click on the link button 63. That is, the alternative mail address of a user may be correlated to the link button 63, and is sent to the e-commerce server 10 upon click on the link button 63.

In this case, in obtaining an undelivered mail to be shown in the undelivered mail list screen 70 (step S202 in FIG. 15), the actual mail address of the user may be obtained based on the alternative mail address of the user, which is sent from the user terminal 6 upon click on the link button 63 in the purchase history screen 60, and information on the correlation between the actual mail address and the alternative mail address. For example, the actual mail address of the user may be obtained based on the alternative mail address of the user and the user table (FIG. 6) or the mail address table (FIG. 12), and an undelivered mail may be obtained from the undelivered mail table (FIG. 13), based on the actual mail address obtained.

(2) For example, in registering an undelivered e-mail in the undelivered mail table (FIG. 13), the user ID of a user set as the destination of the e-mail may be included in the main text or header of the e-mail. A time for including the user ID into the main text or header of the e-mail may be the same as a time at which to register the undelivered e-mail in the undelivered mail table, or a time at which to forward the e-mail addressed to the alternative mail address of the user to the actual mail address of the user.

In this case, the processing shown in FIG. 14 will be modified as to be described later.

Initially, a case in which a user ID is included into the main text or header of an undelivered e-mail when registering the undelivered e-mail in the undelivered mail table will be described. In this case, for example, at step S105 in FIG. 14, the control unit of the relay server 20 obtains the user ID of the user set as the destination of the undelivered e-mail, based on the actual mail address of the user set in "Envelop To" or "To" in the e-mail. Specifically, the control unit accesses the user table to obtain the user ID correlated to the actual mail address, and then adds the obtained user ID to the main text or header of the undelivered e-mail when registering the mail body (the main text and header) of the undelivered e-mail in the "mail body" field.

Next, a case in which the relay server 20 includes a user ID into the main text or header of an e-mail sent addressed to the alternative mail address of the user when forwarding the e-mail to the actual mail address of the user will be described. In this case, the control unit of the relay server 20 obtains the user ID of the user, based on the alternative mail address of the user set in "Envelop To" or "To" of the e-mail addressed to the alternative mail address of the user. That is, the control unit accesses the user table to obtain the user ID correlated to the alternative mail address, and then includes the obtained user ID into the main text or header of the e-mail to be forwarded to the actual mail address of the user.

Although it has been described in the above that the user ID correlated to the actual mail address or alternative mail address is obtained by accessing the user table, the user ID, the actual mail address, and the alternative mail address may be stored so as to be correlated to one another in the mail address table (FIG. 12). With this arrangement, the control unit of the relay server 20 can obtain the user ID correlated to the actual mail address or the alternative mail address, by referring to the mail address table.

For example, the processing shown in FIG. 15 may be modified as to be described below. That is, at step S202 in FIG. 15, the control unit of the e-commerce server 10 accesses the undelivered mail table (FIG. 13) to search a record having the user ID received at step S201, included in the mail main text or header registered in the "mail body" field thereof, and then obtains the found record as undelivered mail list data.

In this manner, it is possible to obtain an undelivered mail, using a user ID, when obtaining an undelivered mail to be shown in the undelivered mail list screen 70 (step S202 in FIG. 15). As a result, even when the actual mail address of a user has been changed, it is possible to show an undelivered mail before the change to the actual mail address in the undelivered mail list screen 70 and the undelivered mail detail screen 80.

(3) For example, the undelivered mail table (FIG. 13) may include a "user ID" field for registering the user ID of a user set as a destination of an undelivered e-mail. FIG. 17 shows one example of an undelivered mail table in this case. A "user ID" field is added to the undelivered mail table shown in FIG.

17, with the fields other than the "user ID" field being similar to those of the undelivered mail table shown in FIG. 13.

When using the undelivered mail table shown in FIG. 17, the processing shown in FIGS. 14 and 15 will be modified as to be described below.

For example, at step S105 in FIG. 14, the control unit of the relay server 20 obtains the user ID of a user set as a destination of the undelivered e-mail, based on the actual mail address of the user set in "Envelop To" or "To" of the e-mail. Specifically, the control unit accesses the user table to obtain the user ID correlated to the actual mail address. Then, the control unit registers the obtained user ID in the "user ID" field of a record newly added to the undelivered mail table.

Note that the user ID, the actual mail address, and the alternative mail address may be stored so as to be correlated to one another in the mail address table (FIG. 12). With this arrangement, the control unit of the relay server 20 can obtain the user ID correlated to the actual mail address, by referring to the mail address table.

For example, at step S203 in FIG. 15, the control unit of the e-commerce server 10 accesses the undelivered mail table (FIG. 17) to search a record having the user ID received at step S201, registered in the "user ID" field thereof, and then obtains the found record as undelivered mail list data.

In this manner as well, it is possible to obtain an undelivered mail, using a user ID, when obtaining an undelivered mail to be shown in the undelivered mail list screen 70 (step S202 in FIG. 15). As a result, even when the actual mail address of a user has been changed, it is possible to show an undelivered mail before the change to the actual mail address in the undelivered mail list screen 70 and the undelivered mail detail screen 80.

(4) For example, although only an undelivered e-mail is stored in the undelivered mail data storage unit 410 in the above described first embodiment, e-mails sent from the relay server 20 to the actual mail address of the user may be all stored in the undelivered mail data storage unit 410.

FIG. 18 shows one example of the undelivered mail table stored in the undelivered mail data storage unit 410 in this case. The undelivered mail table shown in FIG. 18 is stored instead of the undelivered mail table shown in FIG. 13. In the undelivered mail table shown in FIG. 18, e-mails sent from the relay server 20 to the actual mail address of the user are all registered.

In the undelivered mail table shown in FIG. 18, an "undelivered flag" field is added, with the fields other than the "undelivered flag" field being similar to those of the undelivered mail table shown in FIG. 13. Information indicating whether or not delivery of an e-mail has been failed is registered in the "undelivered flag" field. For the undelivered mail table shown in FIG. 18, "0" or "1" is registered in the "undelivered flag" field. Specifically, the value "0" means delivery of an e-mail is not failed (that is, an e-mail has been duly delivered); the value "1" means failed delivery of an e-mail. In this case, a record having the value "1" registered in the "undelivered flag" field corresponds to the "undelivered mail data".

When the undelivered mail table shown in FIG. 18 is used, the processing shown in FIGS. 14 and 15 will be modified as to be described below.

For example, after execution of the processing at step S103 in FIG. 14, the control unit of the relay server 20 registers an e-mail sent addressed to the actual mail address of a user, in the undelivered mail table. That is, the control unit newly adds a new record in the undelivered mail table, and registers information on the e-mail in the respective fields of the newly added record. Note that the value "0", for example, is registered in the "undelivered flag" field of the newly added record. After execution of the above-described processing, the control unit executes the processing at step S104.

Further, for example, the control unit executes processing to be described below instead of the processing at step S105 in FIG. 14. That is, the control unit accesses the undelivered mail table to search a record on an undelivered e-mail, and then updates the value "0" registered in the "undelivered flag" field of the found record to the value "1".

Further, for example, at step S203 in FIG. 15, the control unit of the e-commerce server 10 accesses the transaction history table to search a record having the user ID received at step S201 registered in the "user ID" field thereof, and then obtains the mail address registered in the "user mail address" field of the found record. Thereafter, the control unit then accesses the undelivered mail table to search a record having the obtained mail address registered in the "destination" field thereof and the value "1" registered in the "undelivered flag" field thereof, and then obtains the found record as the undelivered mail list data.

The above described modified example 3 may be combined with this modified example 4. That is, the "user ID" field may be added to the undelivered mail table shown in FIG. 18 as well. Further, the above described modified example 2 may be combined with this modified example 4.

(5) Further, for example, when an e-mail addressed to the actual mail address of a user is failed to be delivered, the sender (that is, a shop) of the e-mail may be notified of the failed delivery of the e-mail to the user.

For example, the control unit of the relay server 20 may send an e-mail to inform of failed delivery of the e-mail addressed to the user to the mail address of the shop.

Further, for example, the control unit of the e-commerce server 10 may display a message or an image representative of failed delivery of the e-mail addressed to the user in a screen that is displayed in the shop terminal 5 upon access to the e-commerce server 10 from the shop terminal 5. That is, when the shop terminal 5 accesses the e-commerce server 10, a screen similar to the undelivered mail list screen 70 and the undelivered mail detail screen 80 may be displayed in the shop terminal 5. For example, a list of "an e-mail sent from a shop to a user and failed to be delivered" may be displayed in the undelivered mail list screen 70. In this case, an e-mail may be sent to the mail address of the shop to encourage a person in charge from the shop to look at the above described screen.

In this manner, it is possible to inform a person in charge from a shop of failed delivery of the e-mail sent addressed to the user.

[Second Embodiment]

An e-commerce system according to a second embodiment of the present invention will be described. An overall structure of an e-commerce system 1 according to the second embodiment is similar to that in the first embodiment. The e-commerce system 1 according to the second embodiment as well provides a virtual shopping mall, similar to that in the first embodiment.

In the e-commerce system 1 according to the second embodiment, an e-mail replied from a user to a shop as well is sent via the relay server 20. In the following, an e-commerce system 1 according to the second embodiment will be described mainly referring to a difference from the first embodiment.

In an e-commerce system 1 according to the second embodiment, an alternative mail address of a shop is set as well. FIG. 19 shows one example of a shop table in the second embodiment. The shop table shown in FIG. 19 differs from the shop table shown in FIG. 7 in that the former includes "actual mail address" and "alternative mail address" fields.

A flow of sending an e-mail from a shop to a user in the e-commerce system 1 according to the second embodiment will be described. As a flow of sending an e-mail from a shop to a user is basically similar to that in the first embodiment, FIG. 9 will be referred to in the description below.

That is, an e-mail from a shop to a user is sent from the shop terminal 5 via the mail server 3. The source and destination information of an e-mail sent from the mail server 3 is similar to that in the first embodiment (FIG. 10A). In this case, as the alternative mail address of the user is set as a destination (Envelop To), the e-mail is sent to the relay server 20.

In the relay device 2, when the e-mail having the alternative mail address of the user set as the destination is received, that e-mail is sent addressed to the actual mail address of the user. FIG. 20 shows the source and destination information of the e-mail sent from the relay server 20.

As shown in FIG. 20, the alternative mail address of the shop is set in "From". The alternative mail address of the shop is set in "From" so that an e-mail from the user terminal 6 to the shop is replied via the relay server 20. Note that the alternative mail address of the shop may be set in "Reply-to", though not shown in FIG. 20.

Similar to the first embodiment, a predetermined mail address managed by the relay server 20 is set in "Envelop From". This is to notify the relay server 20 of failed delivery, if caused, of the e-mail.

Similar to the first embodiment, the actual mail address of the user is set in "Envelop To" and "To". As the actual mail address is a mail address managed by the mail server 4, an e-mail having the actual mail address of the user set as a destination (Envelop To) is sent to the mail server 4.

In the mail server 4, when the e-mail sent addressed to the actual mail address of the user is received, that e-mail is stored. When a receipt request for an e-mail addressed to the user is sent from the user terminal 6 to the mail server 4, the mail server 4 sends the received e-mail addressed to the user to the user terminal 6. In the above described manner, an e-mail from the shop to the user is delivered to the user terminal 6.

Note that, similar to the first embodiment, when an e-mail sent from the relay server 20 is failed to be delivered, a notice of failed delivery is sent to the relay server 20. Then, the relay server 20 saves the data on the undelivered e-mail in the database 40.

Figures 21, 22A, 22B:
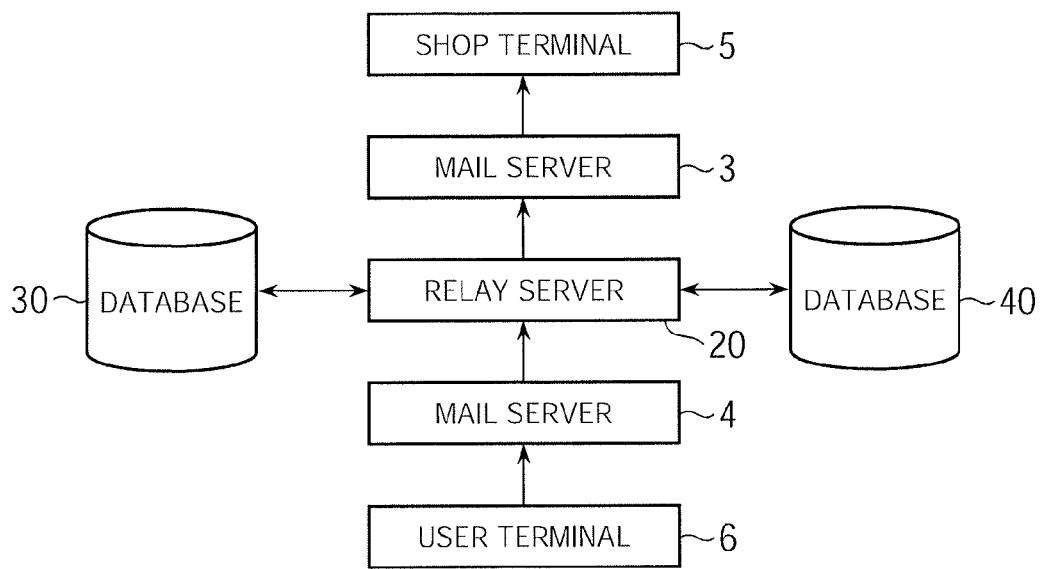
FIG. 21 is a diagram showing a flow of replying an e-mail from a user to a shop.
FIG. 22A is a diagram showing one example of the source and destination information of an e-mail.
FIG. 22B is a diagram showing one example of the source and destination information of an e-mail.

In the following, a flow of replying an e-mail from a user to a shop will be described. FIG. 21 explains a flow of replying an e-mail from a user to a shop. FIGS. 22A and 22B explain change to the source and destination information of the e-mail after being sent from the user terminal 6 before being delivered to the shop terminal 5. In FIGS. 22A and 22B, assume a case in which an e-mail is sent from a user with the user ID "U0001" to a shop with the shop ID "S0001".

An e-mail from the user to the shop is sent from the user terminal 6 via the mail server 4. FIG. 22A shows the source and destination information of the e-mail sent from the mail server 4. As shown in FIG. 22A, the actual mail address of the user, or the source of the e-mail, is set in "Envelop From" and "From", and the mail address of the shop, or the destination of the e-mail, is set in "Envelop To" and "To". As described above, as the alternative mail address of the shop is set in "From" in the e-mail from the shop that is received in the user terminal 6 (FIG. 20), the alternative mail address of the shop is set in "Envelop To" and "To" in the reply mail from the user to the shop.

As the alternative mail address is a mail address managed by the relay server 20, the e-mail having the alternative mail address of the shop set as a destination (Envelop To) is sent to the relay server 20.

In the relay server 20, when the e-mail having the alternative mail address of the shop set as a destination is received, that e-mail is sent addressed to the actual mail address of the shop. FIG. 22B shows the source and destination information of the e-mail sent from the relay server 20.

As shown in FIG. 22B, the alternative mail address of the user, or the source of the e-mail, is set in "From". The alternative mail address of the user is set in "From" in order to keep secret the actual mail address of the user.

Meanwhile, a predetermined mail address managed by the relay server 20 is set in "Envelop From". This is to notify the relay server 20 of failed delivery, if caused, of the e-mail.

Further, the actual mail address of the shop is set in "Envelop To" and "To". As the actual mail address of a shop is a mail address managed by the mail server 3, the e-mail having the actual mail address of the shop set as the destination (Envelop To) is sent to the mail server 3.

In the mail server 3, when the e-mail sent addressed to the actual mail address of the shop is received, that e-mail is stored. When a receipt request for an e-mail addressed to the shop is sent form the shop terminal 5 to the mail server 3, the mail server 3 forwards the received e-mail addressed to the shop to the shop terminal 5. In the above described manner, the e-mail from the user to the shop is delivered to the shop terminal 5.

Note that in the e-commerce system 1 according to the second embodiment, when sending an e-mail from the relay server 20 to the actual mail address of the shop, information obtained based on the content stored in the database 30 is added to the main text or header of the e-mail, of which details are to be described later.

Further, when an e-mail sent from the relay server 20 is failed to be delivered, a notice of failed delivery is sent to the relay server 20. In this case, the relay server 20 may save the data on the undelivered e-mail in the database 40. In this manner, even as to reply of an e-mail from the user to the shop, the e-mail, when failed to be delivered, may be saved in the database 40.

Below, functional blocks implemented in the e-commerce system 1 according to the second embodiment will be described. FIG. 23 is a functional block diagram showing a functional block relevant to the present invention among those implemented in the e-commerce system 1 according to the second embodiment. As shown in FIG. 23, the e-commerce system 1 according to the second embodiment includes an e-mail receiving unit 200a, an actual mail address obtaining unit 210a, an e-mail sending unit 220a, a undelivered mail data saving unit 230a, an information adding unit 240, a mail address storage unit 400a, an undelivered mail data storage unit 410a, a history data storage unit 300, a user identification information obtaining unit 100a, and an undelivered mail data sending unit 110a.

For example, the e-mail receiving unit 200a, the actual mail address obtaining unit 210a, the e-mail sending unit 220a, the undelivered mail data saving unit 230a, and the information adding unit 240 are implemented in the relay server 20. Further, the mail address storage unit 400a and the undelivered mail data storage unit 410a are implemented in the database 40; the user identification information obtaining unit 100a and the undelivered mail data sending unit 110a are implemented in the e-commerce server 10. The history data storage unit 300 is implemented in the database 30.

The e-mail receiving unit 200a receives an e-mail sent to the alternative mail address of a user. The e-mail receiving unit 200a receives an e-mail sent to the alternative mail address of a shop.

When the e-mail addressed to the alternative mail address is received, the actual mail address obtaining unit 210a obtains the actual mail address correlated to the alternative mail address, based on the alternative mail address and information on the correlation between the actual mail address and the alternative mail address. For example, when an e-mail addressed to the alternative mail address of a shop is received, the actual mail address obtaining unit 210a obtains the actual mail address of the shop, based on the content stored in the mail address storage unit 400a.

A mail address table is stored in the mail address storage unit 400a, similar to the mail address storage unit 400 in the first embodiment. Not only the actual mail address and alternative mail address of a user but also an actual mail address and alternative mail address of a shop are stored in the mail address table stored in the mail address storage unit 400a.

The information adding unit 240 adds information obtained based on the content stored in the history data storage unit 300 to the main text or header of the e-mail received by the e-mail receiving unit 200a.

The history data storage unit 300 stores history data on history of purchase of products by a user so as to be correlated to the user ID. In this embodiment, each record in the transaction history table corresponds to the "history data".

In this embodiment, when the electric mail received by the e-mail receiving unit 200a is an e-mail replied from a user to a shop, the information adding unit 240 adds information obtained based on the content stored in the history data storage unit 300 to the main text or header of the e-mail. For example, the information adding unit 240 obtains information to be added to the e-mail received by the e-mail receiving unit 200a, based on the transaction history data stored so as to be correlated to a combination of the user ID of the user, or the source of the e-mail, and the shop ID of the shop, or the destination of the e-mail.

For example, the information adding unit 240 obtains an order number of a purchase by a user who is the source of the e-mail at a shop that is the destination of the e-mail, and then adds the obtained order number to the title or the top of the main text of the e-mail. With the above, a person in charge from the shop can know at a glance to which of the transactions the e-mail replied from the user is related.

For example, the information adding unit 240 may obtain the number of times at which a user who is the source of the e-mail has purchased a produce at a shop that is the destination of the e-mail. Then, the information adding unit 240 may add the number to the title or the top of the main text of the e-mail. Alternatively, the information adding unit 240 may add a message in accordance with the number to the main text or header of the message. For example, when the above mentioned number of times is larger than a predetermined reference number of times, the information adding unit 240 may add a message "reply mail from repeater" to the title or the top of the main text of the e-mail. With the above, a person in charge from the shop can know at a glance how often the user has used the shop so far.

The e-mail sending unit 220a sends the e-mail received by the e-mail receiving unit 200a to the actual mail address obtained by the actual mail address obtaining unit 210a, after setting a predetermined destination as a destination of a notice of failed delivery, if caused, of the e-mail. Note that when the information adding unit 240 has added information to the main text or header of the e-mail received by the e-mail receiving unit 200a, the e-mail sending unit 220a sends the e-mail having the information added thereto by the information adding unit 240 to the actual mail address obtained by the actual mail address obtaining unit 210a, after setting a predetermined destination as a destination of a notice of failed delivery, if caused, of the e-mail. Similar to the first embodiment, for example, the relay server 20 may be set as the "predetermined destination".

For example, when the e-mail received by the e-mail receiving unit 200a is an e-mail sent from a shop to a user, the e-mail sending unit 220a sends the e-mail received by the e-mail receiving unit 200a to the actual mail address obtained by the actual mail address obtaining unit 210a (that is, the actual mail address of the user), after setting a predetermined destination as a destination of a notice of failed delivery, if caused, of the e-mail.

When a notice of failed delivery of the above-described e-mail sent addressed to the actual mail address of the user is received at the predetermined destination, the undelivered mail data saving unit 230a saves undelivered mail data indicating the undelivered e-mail in the undelivered mail data storage unit 410a. In the undelivered mail data storage unit 410a, a mail table similar to the undelivered mail table stored in the undelivered mail data storage unit 410 in the first embodiment is stored, and data on the undelivered e-mail is registered in the undelivered mail table.

Meanwhile, when the e-mail received by the e-mail receiving unit 200a is an e-mail replied from a user to a shop, the information adding unit 240 adds information to the main text or header of the e-mail, as described above, and then the e-mail sending unit 220a sends the e-mail having the information added thereto by the information adding unit 240 to the actual mail address obtained by the actual mail address obtaining unit 210a (that is, the actual mail address of the shop), after setting a predetermined destination as a destination of a notice of failed delivery, if caused, of the e-mail.

Note that when a notice of failed delivery of the above described e-mail addressed to the actual mail address of the shop is received at the predetermined destination as well, the undelivered mail data saving unit 230a may save the undelivered mail data on the undelivered e-mail in the undelivered mail data storage unit 410a.

The user identification information obtaining unit 100a obtains the user identification information sent from a terminal device used by a user, similar to the user identification information obtaining unit 100 in the first embodiment. Similar to the first embodiment, for example, the user terminal 6 corresponds to the above described "terminal device used by a user", and the user ID corresponds to the above described "user identification information". For example, the user identification information obtaining unit 100a obtains a user ID that is sent from the user terminal 6 upon click on the link button 63 in the purchase history screen 60.

Similar to the first embodiment, a "terminal device used by a user" is not limited to a terminal device owned by the user. The actual mail address or alternative mail address of a user may correspond to the "user identification information".

Similar to the undelivered mail data sending unit 110 in the first embodiment, the undelivered mail data sending unit 110a sends undelivered mail data indicating "an e-mail sent addressed to the actual mail address of a user identified by the user identification information obtained by the user identification information obtaining unit 100a and failed to be delivered" to the terminal device used by the user, based on the content stored in the undelivered mail data storage unit 410a. For example, similar to the undelivered mail data sending unit 110a in the first embodiment, the undelivered mail data sending unit 110a sends the screen data on the undelivered mail list screen 70 or the undelivered mail detail screen 80 to the user terminal 6.

Figure 24:
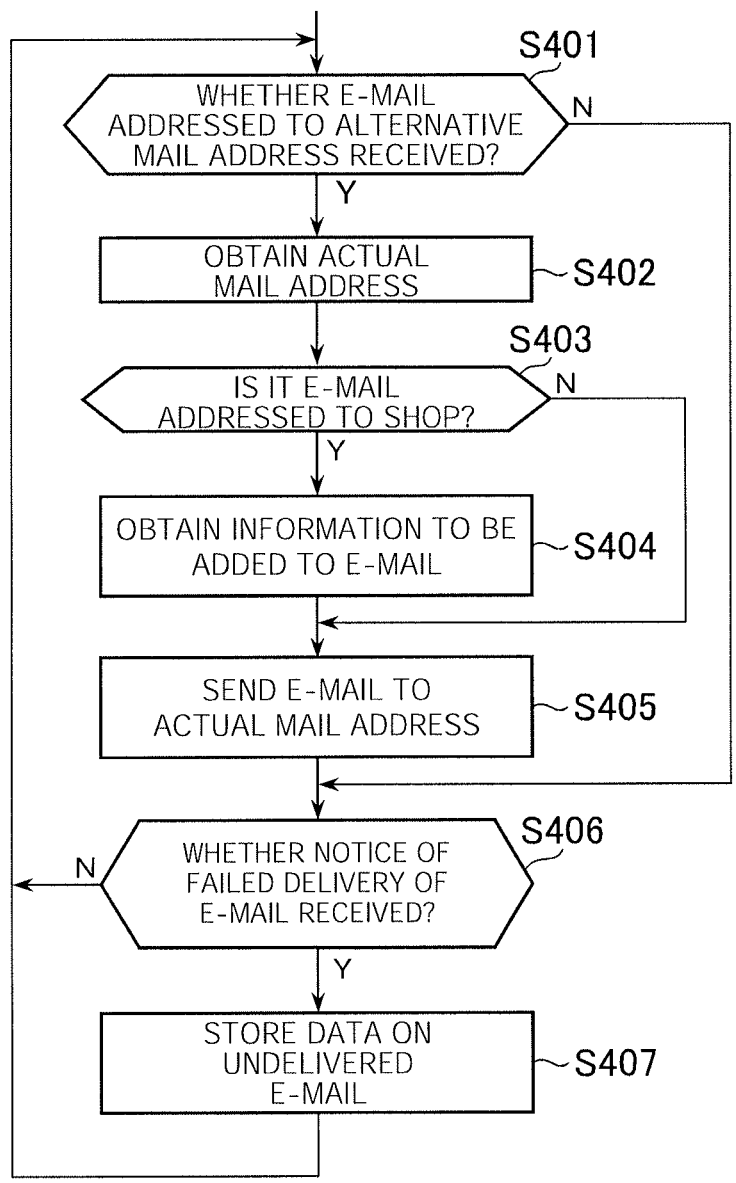
FIG. 24 is a diagram showing one example of processing executed in an e-commerce system according to the second embodiment

The above described e-mail receiving unit 200a, the actual mail address obtaining unit 210a, the e-mail sending unit 220a, the undelivered mail data saving unit 230a, and the information adding unit 240 are implemented by the control unit of the relay server 20 executing processing according to a program. FIG. 24 is a flowchart of one example of processing executed by the control unit to implement these functional blocks. The control unit of the relay server 20 executes processing shown in FIG. 24 according to a program stored in the auxiliary storage unit or the optical disk (an information storage medium), thereby functioning as the above-described functional block.

As shown in FIG. 24, the control unit (the e-mail receiving unit 200a) of the relay server 20 determines whether or not an e-mail sent addressed to the alternative mail address has been received (S401). When the e-mail sent addressed to the alternative mail address has not been received, the control unit executes the processing at step S406 to be described later.

Meanwhile, when an e-mail sent addressed to the alternative mail address has been received, the control unit (the actual mail address obtaining unit 210a) of the relay server 20 obtains the actual mail address correlated to the alternative mail address (S402). For example, the control unit obtains the actual mail address correlated to the alternative mail address, by referring to the mail address table (FIG. 12).

The control unit of the relay server 20 determines whether or not the received e-mail is an e-mail replied from the user to the shop (S403). For example, the control unit determines in which of the user table and the shop table the actual mail address obtained at step S402 is registered, to thereby determine whether or not the received e-mail is an e-mail addressed to the shop.

When the received e-mail is an e-mail addressed to the shop, the control unit (the information adding unit 240) of the relay server 20 obtains information to be added to the e-mail (S404).

For example, when the received e-mail is an e-mail addressed to the shop, as the actual mail address obtained at step S402 is the actual mail address of the shop, the control unit accesses the shop table and obtains the shop ID correlated to the actual mail address. Further, when the received e-mail is an e-mail addressed to the shop, as the actual mail address of the user is set in "From" (FIG. 22A), the control unit accesses the user table to obtain the user ID correlated to the actual mail address.

Then, the control unit accesses the transaction history table to search a record having the shop ID and user ID obtained as described above registered in the "shop ID" and "user ID" fields, respectively, and then obtains information to be added to the e-mail, based on the found record. For example, the control unit obtains the order number registered in the "order number" field of the found record as information to be added to the e-mail. Further, for example, when a larger number of records than a reference number of times are found, the control unit obtains a message "e-mail replied from repeater" as information to be added to the e-mail.

When the processing at step S404 is executed, the control unit (the information adding unit 240 and the e-mail sending unit 220a) of the relay server 20 adds the information obtained at step S404 to the main text or header of the e-mail received at step S401, and then sends the e-mail addressed to the actual mail address obtained at step S402 (S405).

Meanwhile, it is determined at step S403 that the received e-mail is not an e-mail addressed to the shop, the control unit (the e-mail sending unit 220a) sends the e-mail received at step S401 to the actual mail address obtained at step S402 (S405).

Note that at step S405, the control unit sets the actual mail address obtained at step S402 in "Envelop To" and "To". Further, the control unit sets in "Envelop From" a predetermined mail address for receiving at the relay server 20 a notice of failed delivery, if caused, of the e-mail. Further, the control unit sets in "From" the alternative mail address correlated to the actual mail address set in "From" of the e-mail received at step S401.

After execution of the processing at step S405, the control unit of the relay server 20 determines whether or not a notice of failed delivery of the e-mail sent addressed to the actual mail address has been received (S406). When the notice has been received, the control unit (the undelivered mail data saving unit 230a) saves the data on the undelivered e-mail in the database 40 (S407). This processing is similar to that at step S105 in FIG. 14. However, in the second embodiment, as the alternative mail address is set in "From", the actual mail address correlated to the alternative mail address is obtained, and registered in the "source" field.

Meanwhile, when it is not determined at step S406 that the above-described notice has been received or when the processing at step S407 has been executed, the control unit of the relay server 20 executes again the processing at step S401.

The above described user identification information obtaining unit 100a and undelivered mail data sending unit 110a are implemented by the control unit of the e-commerce server 10 executing processing according to a program stored in the auxiliary storage unit or the optical disk (an information storage medium). The processing executed by the control unit of the e-commerce server 10 to implement the user identification information obtaining unit 100a and the undelivered mail data sending unit 110a is similar to that in the first embodiment (FIGS. 15 and 16), of which description is omitted here.

According to the e-commerce system 1 according to the above described second embodiment, a reply e-mail from a user to a shop as well is sent via the relay server 20. As a result, for example, it is possible to reply an e-mail from a user to a shop while keeping secret the actual mail address of the user.

Further, according to the e-commerce system 1 according to the second embodiment, it is possible to add information based on transaction history between a user and a shop to an e-mail to be replied from the user to the shop. That is, it is possible to provide a shop selling a product to a user with useful information, and to thereby assist the shop selling a product to the user.

Below, a modified example of the e-commerce system 1 according to the second embodiment will be described.

For example, the information adding unit 240 may add information to the main text or header of an e-mail sent from a shop to a user as well. In this manner, it is possible to provide a user buying a product with useful information.

Further, for example, the undelivered mail data sending unit 110a may send the undelivered mail data indicating "an e-mail sent addressed to the actual mail address of a shop relevant to the shop identification information sent from the shop terminal 5, and failed to be delivered" to the shop terminal 5, based on the content stored in the undelivered mail data storage unit 410a. For example, the undelivered mail data sending unit 110a may send the screen data on a screen similar to the undelivered mail list screen 70 and the undelivered mail detail screen 80 to the shop terminal 5.

In this manner, even when an e-mail addressed to a shop is failed to be delivered, it is possible to ensure that a person in charge from the shop can know the content of the e-mail.

Note that the present invention is not limited to the above first and second embodiments.

For example, although it has been described in the above that the user identification information obtaining unit 100, 100a, and the undelivered mail data sending unit 110, 110a are implemented in the e-commerce server 10, the user identification information obtaining unit 100, 100a and the undelivered mail data sending unit 110, 110a may be implemented in a server other than the e-commerce server 10.

For example, although it is set in the above such that a notice of failed delivery of an e-mail sent from the relay server 20 is sent to the relay server 20, the above-described notice may be sent to a server other than the relay server 20. In this case, the undelivered mail data saving unit 230, 230a may be implemented in the server that receives the above-described notice.

In the e-commerce system 1, not only a product, such as clothes, food, and so forth, but also data, for example, electronic book data, music data, video data, and so forth may be sold as a product. Further, in the e-commerce system 1, not only a transaction between a shop and a consumer but also a transaction between consumers may be performed.

In the e-commerce system 1, service may be provided by a service producer. The present invention is applicable to a case in which a user utilizes a service provided by a provider as well as long as an e-mail is exchanged between the provider and the user, similar to a case in which a user buys a product sold by a seller.

The present invention is applicable to a system other than an e-commerce system. That is, an e-mail system according to an embodiment of the present invention can be implemented in a system other than an e-commerce system.

The invention claimed is:

1. An e-mail system comprising a relay device for relaying an e-mail sent addressed to a user, wherein
the relay device comprises:
a first memory operable to store first program code;
at least one first processor operable to access said first memory and read said first program code and operate as instructed by said first program code,
said first program code comprises:
e-mail receiving code configured to cause at least one of said at least one first processor to receive an e-mail sent addressed to an alternative mail address of the user that is used instead of an actual mail address of the user so that the relay device receives the e-mail sent addressed to the alternative mail address of the user;
actual mail address obtaining code configured to cause at least one of said at least one first processor to obtain, in response to receiving the e-mail sent to the alternative mail address of the user, the actual mail address of the user, based on the alternative mail address and information on a correlation between the actual mail address of the user and the alternative mail address of the user; and
e-mail sending code configured to cause at least one of said at least one first processor to, in response to the actual mail address of the user being obtained, send the e-mail to the actual mail address of the user after setting a predetermined destination address managed by the e-mail system as a destination of a notice of failed delivery of the e-mail to the actual mail address, the e-mail system further comprises:
a second memory operable to store second program code;
at least one second processor operable to access said second memory and read said second program code and operate as instructed by said second program code, and
one of said first program code or said second program code comprises:
undelivered mail data saving code configured to cause at least one of said at least one first processor or at least one of said at least one second processor to, in response to the notice of failed delivery of the e-mail sent addressed to the actual mail address of the user is received by the predetermined destination address, save the e-mail in an undelivered mail data storage as undelivered mail data;
user identification information obtaining code configured to cause at least one of said at least one first processor or at least one of said at least one second processor to, after the notice of failed delivery of the e-mail sent addressed to the actual mail address of the user is received by the predetermined destination address, obtain user identification information sent from a terminal device used by the user; and
undelivered mail data sending code configured to cause at least one of said at least one first processor or at least one of said at least one second processor to, in response to the user identification information being obtained from the terminal device, send the saved undelivered mail data to the terminal device based on the obtained user identification information.

2. The e-mail system according to claim 1, wherein
the relay device relays an e-mail sent from a seller of a product or a provider of a service to the user;
the user identification information is identification information for use in identifying a user who buys the product or uses the service;
one of the first program code or the second program code includes code configured to cause at least one of said at least one first processor or at least one of said at least one second processor to obtain content stored in history data storage, the history data storage storing history data on history of purchase of the product or use of the service by the user, relevant to the user identification information, in correlation to the user identification information,
the history data includes data indicating the actual mail address of the user, which is used in the purchase of the product or the use of the service by the user,
the undelivered mail data includes data indicating the actual mail address of the user, which is a destination of the e-mail failed to be delivered, and
the undelivered mail data sending code includes
code configured to cause at least one of said at least one first processor or at least one of said at least one second processor to obtain the actual mail address of the user, which is used in the purchase of the product or the use of the service by the user relevant to the user identification information, based on the history data stored so as to be correlated to the obtained user identification information, and
code configured to cause at least one of said at least one first processor or at least one of said at least one second processor to send the undelivered mail data to the terminal device used by the user, the undelivered mail data being an e-mail sent addressed to the obtained actual mail address and failed to be delivered.

3. The e-mail system according to claim 1, wherein
the relay device relays an e-mail sent from a seller of a product or a provider of a service to the user;
the user identification information is identification information for use in identifying a user who buys the product or uses the service;
the undelivered mail data saving code is further configured to cause at least one of said at least one first processor or at least one of said at least one second processor to store the e-mail failed to be delivered as the undelivered mail data so as to be correlated to the user identification information of the user in the undelivered mail data storage, in the case where the notice of failed delivery of the e-mail sent to the actual mail address of the user is received at the predetermined destination address, and
the undelivered mail data sending code is further configured to cause at least one of said at least one first processor or at least one of said at least one second processor to send the undelivered mail data stored so as to be correlated to the obtained user identification information to the terminal device.

4. The e-mail system according to claim 1, wherein
the relay device relays an e-mail sent from a seller of a product or a provider of a service to the user;
the user identification information is identification information for use in identifying a user who buys the product or uses the service;
the undelivered mail data saving code is further configured to cause at least one of said at least one first processor or at least one of said at least one second processor to store data including a main text or a header of the e-mail failed to be delivered as the undelivered mail data in the undelivered mail data storage, in the case where the notice of failed delivery of the e-mail sent to the actual mail address of the user is received at the predetermined destination address,
the main text or the header of the e-mail failed to be delivered and included in the undelivered mail data stored in the undelivered mail data storage includes the user identification information of the user who is a destination of the e-mail, and
the undelivered mail data sending code includes
code configured to cause at least one of said at least one first processor or at least one of said at least one second processor to obtain the undelivered mail data, based on the obtained user identification information and the user identification information included in the main text or the header of the e-mail failed to be delivered and included in the undelivered mail data stored in the undelivered mail data storage, the undelivered mail data being the e-mail sent addressed to the actual mail address of the user relevant to the obtained user identification information and failed to be delivered, and
code configured to cause at least one of said at least one first processor or at least one of said at least one second processor to send the undelivered mail data obtained to the terminal device.

5. The e-mail system according to claim 1, wherein
the undelivered mail data includes the actual mail address of the user which is a destination of the e-mail failed to be delivered,
one of the first program code or the second program code includes code configured to cause at least one of said at least one first processor or at least one of said at least one second processor to obtain content stored in storage for storing the actual mail address of the user relevant to the user identification information so as to be correlated to the user identification information,
the undelivered mail data sending code includes
code configured to cause at least one of said at least one first processor or at least one of said at least one second processor to obtain the actual mail address stored so as to be correlated to the obtained user identification information, and
code configured to cause at least one of said at least one first processor or at least one of said at least one second processor to send the undelivered mail data including the obtained actual mail address to the terminal device, and
the e-mail system comprises
code configured to cause at least one of said at least one first processor or at least one of said at least one second processor to change, in a case where the actual mail address of the user is changed from a first mail address to a second mail address, the actual mail address stored so as to be correlated to the user identification information of the user from the first mail address to the second mail address; and
code configured to cause at least one of said at least one first processor or at least one of said at least one second processor to change, in the case where the actual mail address of the user is changed from the first mail address to the second mail address, the actual mail address of the user included in the undelivered mail data stored in the undelivered mail data storage from the first mail address to the second mail address.

6. The e-mail system according to claim 1, wherein
the undelivered mail data includes the actual mail address of the user which is a destination of the e-mail failed to be delivered,
the user identification information is the actual mail address of the user,
the user identification information obtaining code is further configured to cause at least one of said at least first one processor or at least one of said at least one second processor to obtain the actual mail address of the user sent from the terminal device as the user identification information,
the undelivered mail data sending code is further configured to cause at least one of said at least one first processor or at least one of said at least one second processor to send the undelivered mail data including the obtained actual mail address of the user to the terminal device, and
in a case where the actual mail address of the user is changed from a first mail address to a second mail address, the e-mail system changes the actual mail address of the user included in the undelivered mail data stored in the undelivered mail data storage from the first mail address to the second mail address.

7. The e-mail system according to claim 1, wherein
the undelivered mail data includes the actual mail address of the user which is a destination of the e-mail failed to be delivered,
the user identification information is the alternative mail address of the user,
the user identification information obtaining code is further configured to cause at least one of said at least first one processor or at least one of said at least one second processor to obtain the alternative mail address of the user sent from the terminal device as the user identification information, the undelivered mail data sending code includes code configured to cause at least one of said at least first one processor or at least one of said at least one second processor to obtain the actual mail address of the user, based on the obtained alternative mail address of the user and the information on the correlation between the actual mail address and the alternative mail address, and code configured to cause at least one of said at least one first processor or at least one of said at least one second processor to send the undelivered mail data including the obtained actual mail address of the user to the terminal device, and in a case where the actual mail address of the user is changed from a first mail address to a second mail address, the e-mail system changes the actual mail address of the user included in the undelivered mail data stored in the undelivered mail data storage from the first mail address to the second mail address.

8. The e-mail system according to claim 1, further comprising performing code configured to cause at least one of said at least one first processor or at least one of said at least one second processor to performing, in the case where the notice of failed delivery of the e-mail sent addressed to the actual mail address of the user is received at the predetermined destination address, a notice to a sender of the e-mail.

9. The e-mail system according to claim 1, wherein the relay device relays an e-mail sent from a seller of a product or a provider of a service to the user, and relays an e-mail sent from the user to the seller or the provider, the e-mail receiving code includes code configured to cause at least one of said at least one first processor to receive an e-mail sent from the seller or the provider to the alternative mail address of the user; and code configured to cause at least one of said at least one first processor to receive an e-mail sent from the user to an alternative mail address that is used instead of an actual mail address of the seller or the provider so that the relay device receives the e-mail sent to the seller or the provider, the actual mail address obtaining code includes code configured to cause at least one of said at least one first processor to obtain, in a case where the e-mail sent from the seller or the provider to the alternative mail address of the user is received, the actual mail address of the user, based on the alternative mail address and the information on the correlation between the actual mail address and the alternative mail address, and code configured to cause at least one of said at least one first processor to obtain, in a case where the e-mail sent from the user to the alternative address of the seller or the provider is received, the actual mail address of the seller or the provider, based on the alternative mail address and the information on the correlation between the actual mail address and the alternative mail address, and the e-mail sending code includes first sending code configured to cause at least one of said at least one first processor to send, in the case where the e-mail sent from the seller or the provider to the alternative mail address of the user is received, the e-mail to the actual mail address of the user after setting a predetermined destination address as a destination of a notice of failed delivery, if caused, of the e-mail and setting the alternative mail address of the seller or the provider as a source or a reply destination of the e-mail, and second sending code configured to cause at least one of said at least one first processor to send, in the case where the e-mail sent from the user to the alternative address of the seller or the provider is received, the e-mail to the actual mail address of the seller or the provider after setting the alternative mail address of the user as a source or a reply destination of the e-mail.

10. The e-mail system according to claim 9, wherein the user identification information is identification information for use in identifying a user who purchases the product or uses the service, the first program code includes code is further configured to cause at least one of said at least one first processor to obtain content stored in history data storage for storing history data on history of purchase of the product or use of the service by the user relevant to the user identification information, so as to be correlated to the user identification information, and the second sending code includes information adding code configured to cause at least one of said at least one first processor to add, in the case where the e-mail sent from the user to the alternative address of the seller or the provider is received, information obtained based on the history data stored so as to be correlated to the user identification information of the user to a main text or a header of the e-mail, and code configured to cause at least one of said at least one first processor to send the e-mail having the information added thereto to the actual mail address of the seller or the provider after setting the alternative mail address of the user as the source or the reply destination of the e-mail.

11. The e-mail system according to claim 1, wherein the predetermined destination address is managed by the relay device, and the first program code includes the undelivered mail data saving code.

12. A control method for an e-mail system including a relay device, the relay device including at least one first processor, and the e-mail system further including at least one second processor, for relaying an e-mail sent addressed to a user, the control method comprising:

receiving, using at least one of said at least one first processor, by the relay device, an e-mail sent addressed to an alternative mail address of the user that is used instead of an actual mail address of the user so that the relay device receives the e-mail sent addressed to the alternative mail address of the user;

obtaining, using at least one of said at least one first processor, by the relay device, in response to receiving the e-mail sent to the alternative mail address of the user, the actual mail address of the user, based on the alternative mail address and information on a correlation between the actual mail address of the user and the alternative mail address of the user; and sending, using at least one of said at least one first processor, by the relay device, in response to obtaining the actual mail address of the user, the e-mail to the actual mail address of the user after setting a predetermined destination address managed by the e-mail system as a destination of a notice of failed delivery to the actual mail address;

storing, using at least one of said at least one first processor or at least one of said at least one second processor, in response to the notice of failed delivery of the e-mail sent addressed to the actual mail address of the user is received by the predetermined destination address, the e-mail in an undelivered mail data storage means as undelivered mail data;

obtaining, using at least one of said at least one first processor or at least one of said at least one second processor, after the notice of failed delivery of the e-mail sent addressed to the actual mail address of the user is received by the predetermined destination address, user identification information sent from a terminal device used by the user; and sending, using at least one of said at least one first processor or at least one of said at least one second processor, in response to the user identification information being obtained from the terminal device, the stored undelivered mail data to the terminal device based on the obtained user identification information.

13. The e-mail system according to claim 1, wherein the user identification information comprises log-in information to a website, and the undelivered mail data sending code is configured to cause at least one of said at least one first processor or at least one of said at least one second processor to, in response to the log-in information being obtained from the terminal device, send the saved undelivered mail data to the terminal device through the website based on the obtained user identification information.

14. The e-mail system according to claim 13, wherein the website is an e-commerce site.

15. A non-transitory computer readable information storage medium storing a program for causing a computer to function as a relay device for relaying an e-mail sent addressed to a user, the computer including at least one processor, the program for causing the computer to:

receive, using at least one of said at least one processor, an e-mail sent addressed to an alternative mail address of the user that is used instead of an actual mail address of the user so that the relay device receives the e-mail sent addressed to the alternative mail address of the user;

obtain, using at least one of said at least one processor, in response to receiving the mail sent to the alternative mail address of the user, the actual mail address of the user, based on the alternative mail address and information on correlation between the actual mail address of the user and the alternative mail address of the user;

send, using at least one of said at least one processor, in response to the actual mail address of the user being obtained, the e-mail to the actual mail address of the user after setting a predetermined destination address managed by the e-mail system as a destination of a notice of failed delivery of the e-mail to the actual mail address of the user;

save, using at least one of said at least one processor, in response to the notice of failed delivery of the e-mail sent addressed to the actual mail address of the user is received by the predetermined destination address, the e-mail in an undelivered mail data storage as undelivered mail data;

obtain, using at least one of said processor, after the notice of failed delivery of the e-mail sent addressed to the actual mail address of the user is received by the predetermined destination address, user identification information sent from a terminal device used by the user; and send, using at least one of said at least one processor, in response to the user identification information being obtained from the terminal device, the saved undelivered mail data to the terminal device based on the obtained user identification information.

* * * * *